US012699423B2

(12) United States Patent
Jang

(10) Patent No.: US 12,699,423 B2
(45) Date of Patent: Aug. 4, 2026

(54) DISPLAY MODULE

(71) Applicant: Samsung Display Co., Ltd., Yongin-si (KR)

(72) Inventor: Namjin Jang, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 318 days.

(21) Appl. No.: 18/112,811

(22) Filed: Feb. 22, 2023

(65) Prior Publication Data

US 2023/0350464 A1 Nov. 2, 2023

(30) Foreign Application Priority Data

Apr. 27, 2022 (KR) ........................ 10-2022-0052360

(51) Int. Cl.
*G06F 1/16* (2006.01)
(52) U.S. Cl.
CPC .......... *G06F 1/1656* (2013.01); *G06F 1/1616* (2013.01); *G06F 1/1652* (2013.01)
(58) Field of Classification Search
CPC ..... G06F 1/1656; G06F 1/1652; G06F 1/1616
See application file for complete search history.

(56) References Cited

U.S. PATENT DOCUMENTS

| | | | | | |
|---|---|---|---|---|---|
| 7,915,650 | B2 * | 3/2011 | Lee | ........................ | H10D 86/60 |
| | | | | | 257/E29.151 |
| 8,830,195 | B2 * | 9/2014 | Eom | ...................... | H10K 59/40 |
| | | | | | 345/173 |
| 9,620,742 | B2 * | 4/2017 | Kim | ........................ | H10K 50/87 |
| 10,244,622 | B2 * | 3/2019 | Kim | ...................... | H10K 77/111 |
| 10,520,762 | B2 * | 12/2019 | Jung | ................... | H10K 59/873 |
| 11,048,353 | B1 * | 6/2021 | Luo | ......................... | G06F 3/041 |
| 12,010,803 | B2 * | 6/2024 | Zhu | ...................... | G06F 1/1652 |
| 2018/0076412 | A1 * | 3/2018 | Kim | ..................... | G06F 1/1637 |
| 2018/0196300 | A1 * | 7/2018 | Jung | ..................... | H10K 50/84 |
| 2019/0318689 | A1 * | 10/2019 | Kim | ..................... | H05K 1/0281 |
| 2020/0135063 | A1 * | 4/2020 | Jang | ..................... | G06F 1/1652 |
| 2020/0363882 | A1 * | 11/2020 | Nam | ..................... | H05K 1/189 |

(Continued)

FOREIGN PATENT DOCUMENTS

| | | | | | |
|---|---|---|---|---|---|
| CN | 115359731 | A | * 11/2022 | ............. | H05K 1/147 |
| EP | 3955091 | A1 | * 2/2022 | .......... | H05K 5/0217 |
| KR | 10-1376073 | | 3/2014 | | |

(Continued)

*Primary Examiner* — Imani N Hayman
*Assistant Examiner* — Rashen E Morrison
(74) *Attorney, Agent, or Firm* — F. CHAU & ASSOCIATES, LLC

(57) ABSTRACT

A display module includes a display part and a protection part disposed under the display part. The display part may include a display panel including a bending area bent about a bending axis extending in a direction, a first area disposed at a side of the bending area and displaying an image, and a second area disposed at another side of the bending area and overlapping the first area in a plan view; and a circuit board disposed on the display panel in the second area. The protection part may include a protective film including a top surface facing the second area and the circuit board and an opening overlapping the bending area in a plan view; and a cushion layer disposed on the top surface of the protective film.

20 Claims, 11 Drawing Sheets

(56) References Cited

U.S. PATENT DOCUMENTS

2021/0168937 A1 * 6/2021 Guo ..................... G02B 6/0083
2022/0181581 A1 * 6/2022 Kawamura .......... H10K 77/111

FOREIGN PATENT DOCUMENTS

KR    10-2016-0030599    3/2016
KR    10-2018-0025418    3/2018
KR    10-2018-0083025    7/2018

* cited by examiner

DM

DU

DP

AA1

PL

PU

FB
DEL } FCB

CIC

I'

DIC

AA2

FL

BPL

WM
AL
ARL
DP
FI1
CPN
CSP
FI2
FCB
CIC

DIC ds

BA

E-FI1
BPL
E-1
E-2
E-FI2

E-CI

DR3
DR1
DR2

DISPLAY MODULE

CROSS-REFERENCE TO RELATED APPLICATIONS

This application claims priority to and benefits of Korean Patent Application No. 10-2022-0052360 under 35 U.S.C. § 119, filed in the Korean Intellectual Property Office (KIPO) on Apr. 27, 2022, the entire contents of which are incorporated herein by reference.

BACKGROUND

1. Technical Field

The disclosure relates to a display module having reinforced strength in a bending area.

2. Description of the Related Art

The importance of display devices as communication media has been emphasized because of the increasing developments of information technology. Display devices such as a television, a portable phone, a tablet computer, a navigation device, and a game console may display images to provide information to users. A display device may be manufactured by assembling a display module and an electronic module. The display module may include a display part for generating an image and a protection part for protecting the display part.

The display part may include a bending area bent at a curvature for suitable placement of components. The bending area of the display part may be vulnerable to internal stress or external impact. Thus, a display module for preventing damage of the display part has been studied.

It is to be understood that this background of the technology section is, in part, intended to provide useful background for understanding the technology. However, this background of the technology section may also include ideas, concepts, or recognitions that were not part of what was appreciated by those skilled in the pertinent art prior to a corresponding effective filing date of the subject matter disclosed herein.

SUMMARY

The disclosure provides a display module including a display part having a structure capable of reinforcing the strength of a bending area and a protection part for protecting the bending area of the display part.

Embodiments also provide a display module including a protection part having a simple design and a low manufacturing cost.

However, embodiments of the disclosure are not limited to those set forth herein. The above and other embodiments will become more apparent to one of ordinary skill in the art to which the disclosure pertains by referencing the detailed description of the disclosure given below.

An embodiment of the disclosure provides a display module including a display part and a protection part disposed under the display part. The display part may include a display panel including a bending area bent about a bending axis extending in a direction, a first area disposed at a side of the bending area and displaying an image, and a second area disposed at another side of the bending area and overlapping the first area in a plan view; and a circuit board disposed on the display panel in the second area. The protection part may include a protective film including a top surface facing the second area and the circuit board and an opening overlapping the bending area in a plan view; and a cushion layer disposed on the top surface of the protective film.

In an embodiment, the protective film may include a polyethylene terephthalate film.

In an embodiment, the cushion layer may cover the opening.

In an embodiment, an end of the cushion layer may be disposed on the display panel in the second area, and the protective film may overlap the end of the cushion layer and the circuit board in a plan view.

In an embodiment, a thickness of the protective film may be greater than a thickness of the cushion layer.

In an embodiment, the circuit board may include a board and an electronic component disposed on the board. The electronic component may be exposed from the cushion layer and the protective film.

In an embodiment, the display part may further include a driving chip mounted on the display panel in the second area, and a cover film covering the driving chip. An end of the cover film may be aligned with a boundary between the bending area and the second area.

In an embodiment, the display part may further include a cover layer disposed on a rear surface of the display panel and including a first side surface adjacent to the bending area, and a spacer disposed on a rear surface of the cover layer and including a second side surface adjacent to the bending area. The second side surface may be closer to the bending area than the first side surface.

In an embodiment, a modulus of the spacer may be less than a modulus of the cover layer.

In an embodiment, the display part may further include a first film disposed between the first area of the display panel and the cover layer, and a second film disposed between the second area of the display panel and the spacer and spaced apart from the first film.

In an embodiment, the first film and the second film may include a same material.

In an embodiment, the first film may include a third side surface adjacent to the bending area, and the third side surface may be closer to the bending area than the first side surface.

In an embodiment of the disclosure, a display module includes a display part and a protection part disposed under the display part. The display part may include a display panel including a first area including a display area, a bending area extending from a side of the first area, and a second area extending from a side of the bending area; a cover layer disposed on a rear surface of the display panel; a spacer disposed on a bottom surface of the cover layer; a circuit board disposed on the second area; and a cover film disposed on the second area and the circuit board. An end of the cover film may be aligned with a boundary between the bending area and the second area.

In an embodiment, the cover layer may include a first side surface adjacent to the bending area and the spacer may include a second side surface adjacent to the bending area and protruding from the first side surface of the cover layer toward the bending area.

In an embodiment, a modulus of the spacer may be less than a modulus of the cover layer.

In an embodiment, the display part may further include a first film overlapping the first area in a plan view and disposed between the display panel and the cover layer, and a second film overlapping the second area in a plan view and spaced apart from the first film. The bending area may be disposed between the first film and the second film.

In an embodiment, the first film may include a third side surface adjacent to the bending area, and the third side surface may protrude from the first side surface toward the bending area.

In an embodiment, the display part may further include a window disposed on the display panel, and an anti-reflection layer disposed between the window and the display panel.

In an embodiment, the bending area may be bent about a bending axis extending in a direction, and the second area and the circuit board may be located between the first area and the protection part in a cross-sectional view.

In an embodiment, the protection part may include a cushion layer, and a protective film disposed on a rear surface of the cushion layer and exposing a portion of the rear surface of the cushion layer, the portion of the rear surface of the cushion layer overlapping the bending area in a plan view.

BRIEF DESCRIPTION OF THE DRAWINGS

An additional appreciation according to the embodiments of the disclosure will become more apparent by describing in detail the embodiments thereof with reference to the accompanying drawings, wherein:

FIG. 9B is a schematic cross-sectional view illustrating a display part according to a comparative example.

DETAILED DESCRIPTION OF THE EMBODIMENTS

Figure 1:
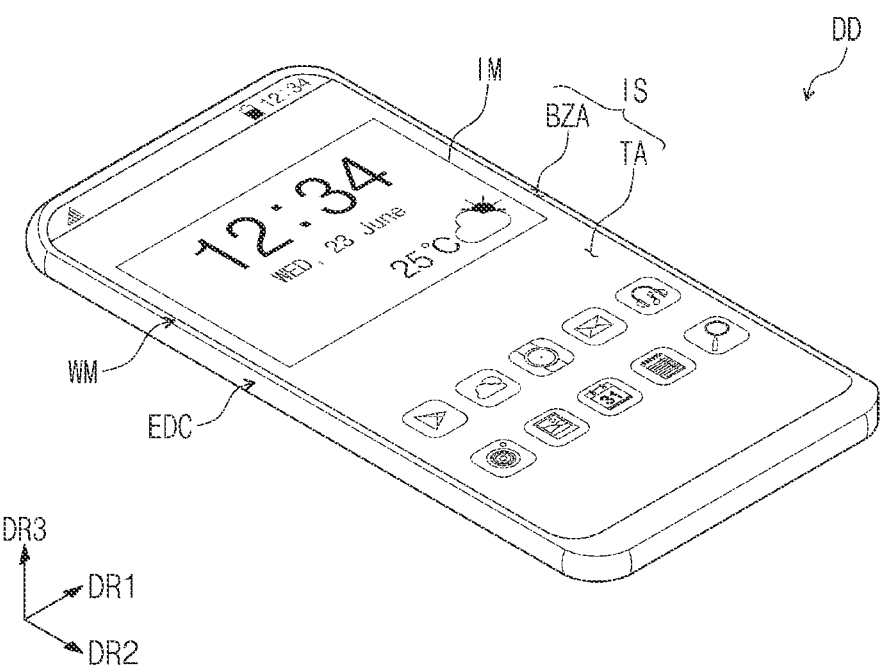
FIG. 1 is a schematic perspective view illustrating a display device according to an embodiment of the disclosure.

In the following description, for the purposes of explanation, numerous specific details are set forth in order to provide a thorough understanding of various embodiments or implementations of the disclosure. As used herein "embodiments" and "implementations" are interchangeable words that are non-limiting examples of devices or methods disclosed herein. It is apparent, however, that various embodiments may be practiced without these specific details or with one or more equivalent arrangements. Here, various embodiments do not have to be exclusive nor limit the disclosure. For example, specific shapes, configurations, and characteristics of an embodiment may be used or implemented in another embodiment.

Unless otherwise specified, the illustrated embodiments are to be understood as providing features of the disclosure. Therefore, unless otherwise specified, the features, components, modules, layers, films, panels, regions, and/or aspects, etc. (hereinafter individually or collectively referred to as "elements"), of the various embodiments may be otherwise combined, separated, interchanged, and/or rearranged without departing from the disclosure. Also, like reference numerals refer to like elements.

When an element, such as a layer is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. To this end, the term "connected" may refer to physical, electrical, and/or fluid connection, with or without intervening elements.

In the specification and the claims, the terms "and/or" is intended to include any combination of the terms "and" and "or" for the purpose of its meaning and interpretation. For example, "A and/or B" may be understood to mean "A, B, or A and B." The terms "and" and "or" may be used in the conjunctive or disjunctive sense and may be understood to be equivalent to "and/or."

The terminology used herein is for the purpose of describing particular embodiments and is not intended to be limiting. As used herein, the singular forms "a," "an," and "the" are intended to include the plural forms as well, unless the context clearly indicates otherwise. Moreover, the terms "comprises," "comprising," "includes," and/or "including," when used in this specification, specify the presence of stated features, regions, integers, steps, operations, elements, components, and/or groups thereof, but do not preclude the presence or addition of one or more other features, regions, integers, steps, operations, elements, components, and/or groups thereof.

Spatially relative terms, such as "beneath," "below," "under," "lower," "above," "upper," "over," "higher," "side" (e.g., as in "sidewall"), and the like, may be used herein for descriptive purposes, and, thereby, to describe one elements relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the term "below" can encompass both an orientation of above and below. Furthermore, the apparatus may be otherwise oriented (e.g., rotated 90 degrees or at other orientations), and, as such, the spatially relative descriptors used herein should be interpreted accordingly.

Although the terms "first," "second," and the like may be used herein to describe various elements, these elements should not be limited by these terms. These terms are only used to distinguish one element from another element. Thus, a first element discussed below could be termed a second element without departing from the teachings of the disclosure.

The terms "about" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" may mean within one or more standard deviations, or within ±30%, 20%, 10%, 5% of the stated value.

For the purposes of this disclosure, the phrase "at least one of A and B" may be construed as A only, B only, or any combination of A and B. Also, "at least one of X, Y, and Z" and "at least one selected from the group consisting of X, Y, and Z" may be construed as X only, Y only, Z only, or any combination of two or more of X, Y, and Z.

Unless otherwise defined or implied herein, all terms (including technical and scientific terms) used herein have the same meaning as commonly understood by those skilled in the art to which this disclosure pertains. It will be further understood that terms, such as those defined in commonly used dictionaries, should be interpreted as having a meaning that is consistent with their meaning in the context of the relevant art and the disclosure, and should not be interpreted in an ideal or excessively formal sense unless clearly so defined herein.

The use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified. Further, in the accompanying drawings, the size and relative sizes of elements may be exaggerated for clarity and/or descriptive purposes. Accordingly, variations from the shapes of the illustrations as a result, for example, of manufacturing techniques and/or tolerances, are to be expected. Thus, embodiments should not be construed as limited to the shapes of regions illustrated herein but are to include deviations in shapes that result, for example, from manufacturing. For example, an etching region illustrated as a rectangle will, typically, have rounded or curved features. Thus, the regions illustrated in the figures are schematic in nature and their shapes are not intended to illustrate the actual shape of a region of a device and are not intended to limit the scope of embodiments.

When an embodiment may be implemented differently, a specific process order may be performed differently from the described order. For example, two consecutively described processes may be performed substantially at the same time or performed in an order opposite to the described order.

Various embodiments are described herein with reference to sectional and/or exploded illustrations that are schematic illustrations of embodiments and/or intermediate structures. As such, variations from the shapes of the illustrations as a result, for example, of manufacturing techniques and/or tolerances, are to be expected. Thus, embodiments disclosed herein should not necessarily be construed as limited to the particular illustrated shapes of regions, but are to include deviations in shapes that result from, for instance, manufacturing. In this manner, regions illustrated in the drawings may be schematic in nature and the shapes of these regions may not reflect actual shapes of regions of a device and, as such, are not necessarily intended to be limiting.

As customary in the field, some embodiments are described and illustrated in the accompanying drawings in terms of functional blocks, units, and/or modules. Those skilled in the art will appreciate that these blocks, units, and/or modules are physically implemented by electronic (or optical) circuits, such as logic circuits, discrete components, microprocessors, hard-wired circuits, memory elements, wiring connections, and the like, which may be formed using semiconductor-based fabrication techniques or other manufacturing technologies. In the case of the blocks, units, and/or modules being implemented by microprocessors or other similar hardware, they may be programmed and controlled using software (e.g., microcode) to perform various functions discussed herein and may optionally be driven by firmware and/or software. It is also contemplated that each block, unit, and/or module may be implemented by dedicated hardware, or as a combination of dedicated hardware to perform some functions and a processor (e.g., one or more programmed microprocessors and associated circuitry) to perform other functions. Also, each block, unit, and/or module of some embodiments may be physically separated into two or more interacting and discrete blocks, units, and/or modules without departing from the scope of the disclosure. Further, the blocks, units, and/or modules of some embodiments may be physically combined into more complex blocks, units, and/or modules without departing from the scope of the disclosure.

Hereinafter, display devices and display modules of the disclosure are described in detail with reference to the accompanying drawings.

Figure 2:
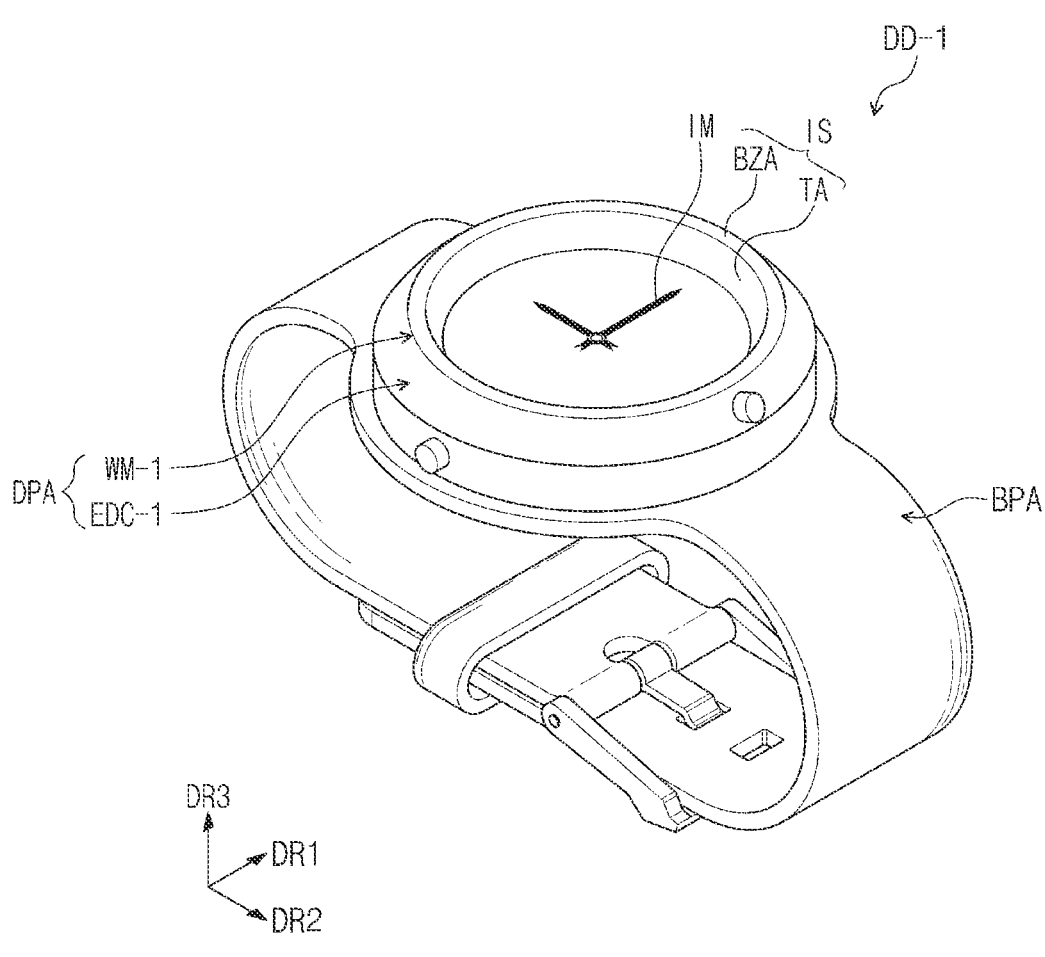
FIG. 2 is a schematic perspective view illustrating a display device according to an embodiment of the disclosure.

FIG. 1 is a schematic perspective view illustrating a display device according to an embodiment of the disclosure. FIG. 2 is a schematic perspective view illustrating a display device according to an embodiment of the disclosure.

Referring to FIGS. 1 and 2, a display device DD (or DD-1) may be a device activated by an electrical signal and display an image IM. The display device DD (or DD-1) may be variously embodied. For example, the display device DD (or DD-1) may be included in a large-sized device (e.g., a television or a billboard) or a small or middle-sized device (e.g., a monitor, a portable phone, a smart watch, a tablet computer, a navigation device, or a game console). However, the display device DD (or DD-1) according to the disclosure is not limited thereto. FIG. 1 illustrates a portable phone as an example of the display device DD, and FIG. 2 illustrates a smart watch as an example of the display device DD-1.

The display device DD (or DD-1) may display the image IM in a third direction DR3 through a display surface IS parallel to a plane defined by a first direction DR1 and a second direction DR2. The third direction DR3 may be substantially parallel to a normal direction of the display surface IS. The display surface IS in which the image IM is displayed may correspond to a front surface of the display device DD (or DD-1). The image IM may include a static image and/or a dynamic image.

In the embodiment, a front surface (or a top surface) and a rear surface (or a bottom surface) of each component (or each part) may be defined based on a direction (e.g., the third direction DR3) in which the image IM is displayed. The front surface and the rear surface may be opposite to each other in the third direction DR3, and a normal direction of each of the front surface and the rear surface may be substantially parallel to the third direction DR3. A distance between the front surface and the rear surface defined in the third direction DR3 may correspond to a thickness of each component (or each part).

In the specification, when one or more components are viewed in a plan view, the one or more components may be viewed in the third direction DR3. In the specification, when one or more components are viewed in a cross-sectional view, the one or more components may be viewed in the first direction DR1 or the second direction DR2. However, directions indicated by the first to third directions DR1, DR2, and DR3 may be relative concepts and may be changed into other directions.

The display device DD (or DD-1) may be flexible or rigid. The term 'flexible' may mean a bendable property and may mean a structure bendable by several nanometers, a completely foldable structure, or the like. For example; the flexible display device may be a curved display device or a foldable display device.

The display device DD (or DD-1) may sense an external input applied from the outside thereof. The external input may be at least one of various kinds of inputs (e.g., a pressure, a temperature, light, etc.) provided from the outside of the display device DD (or DD-1). The external input may include an input (e.g., a hovering input) proximately applied to the display device DD (or DD-1), an input providing a touch (e.g., a touch by a user's finger or a pen) to the display device DD (or DD-1), or the like.

The display surface IS of the display device DD (or DD-1) may include a transmission area TA and a bezel area BZA.

The transmission area TA may be an area having a high light transmittance. The transmission area TA may be an area in which the image IM is displayed, and a user may view the image IM through the transmission area TA. FIG. 1 illustrates the transmission area TA having a rectangular shape having a rounded corner, and FIG. 2 illustrates the transmission area TA having a circular shape. However, embodiments of the disclosure are not limited thereto, and the shape of the transmission area TA may be variously modified depending on a design of the display device DD (or DD-1).

The bezel area BZA may be an area having a light transmittance lower than a light transmittance of the transmission area TA. The bezel area BZA may be an area which has a color (e.g., a predetermined or selectable color) and is configured to block light. The bezel area BZA may prevent some components of the display device DD (or DD-1), which overlap the bezel area BZA in a plan view, from being visible to the outside.

The bezel area BZA may be adjacent to the transmission area TA. For example, the bezel area BZA may be disposed outside the transmission area TA and may be adjacent to (e.g., surround) the transmission area TA. Thus, the shape of the transmission area TA may be substantially defined by the bezel area BZA. However, embodiments of the disclosure are not limited thereto, and in other embodiments, the bezel area BZA may be adjacent to the transmission area TA (e.g., surround a portion of the transmission area TA). In some embodiments, the bezel area BZA may be omitted. In an embodiment, the bezel area BZA may be disposed at a side surface (not the front surface) of the display device DD (or DD-1).

Referring to FIG. 1, the display device DD may include a window WM and a case EDC. The window WM and the case EDC may be coupled to each other to constitute an exterior of the display device DD and may provide an internal space capable of accommodating components of the display device DD.

Referring to FIG. 2, the display device DD-1 may be a display device wearable on a user's body (e.g., wrist). The display device DD-1 may include a display portion DPA and a body portion BPA The display portion DPA may be activated by an electrical signal and may generate the image IM. The display portion DPA may include a window WM-1 and a case EDC-1. The window WM-1 and the case EDC-1 of the display portion DPA may be coupled to each other to constitute an exterior of the display portion DPA and may accommodate components of the display portion DPA.

The body portion BPA may be a component wearable on the user's body. FIG. 2 illustrates the body portion BPA provided as a watch strap. However, the shape of the body portion BPA is not limited thereto and may be changed into other various shapes wearable on the user's body. The body portion BPA may be coupled to the case EDC-1 of the display portion DPA.

Figure 3:
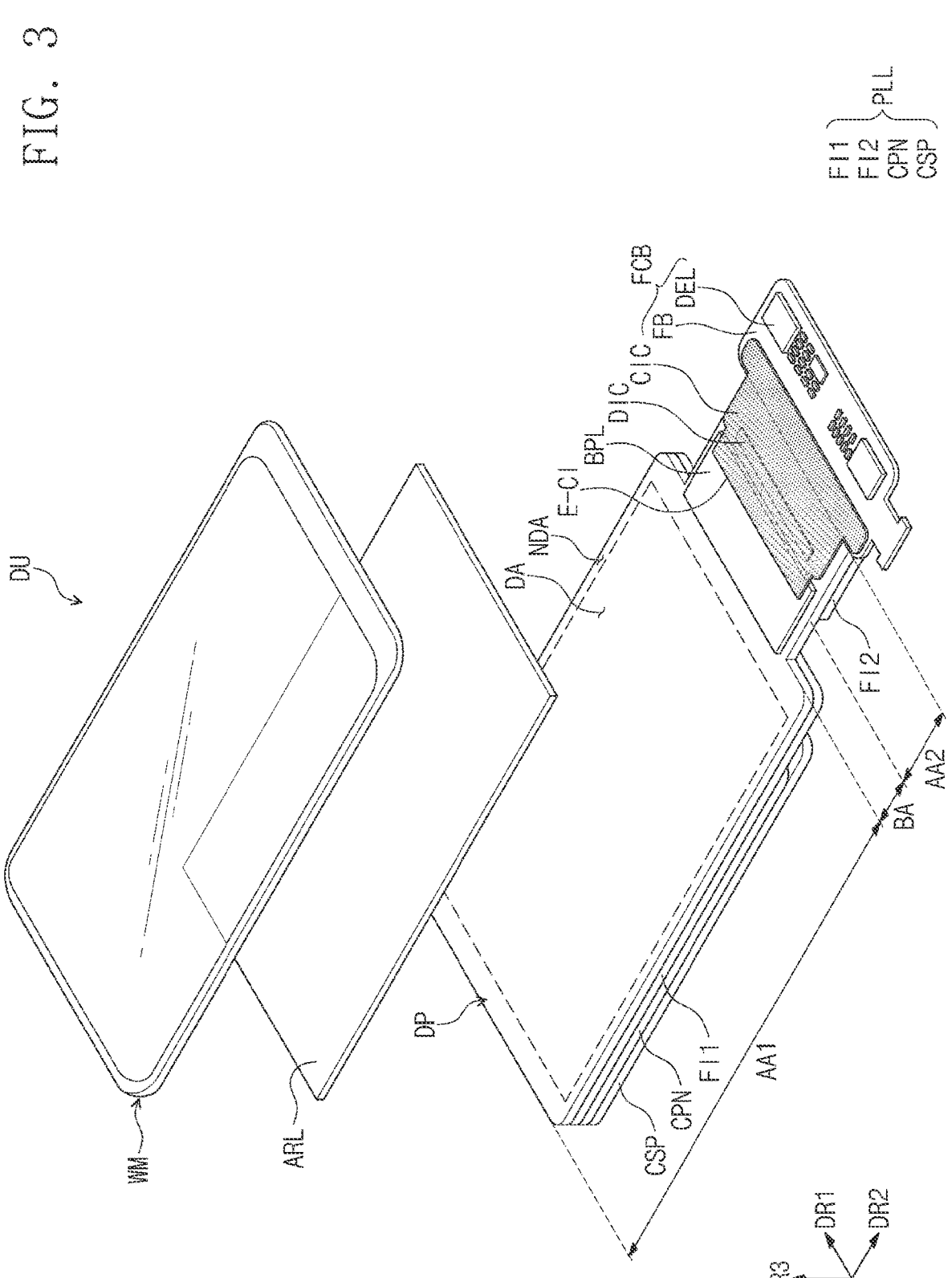
FIG. 3 is a schematic exploded perspective view illustrating a display part according to an embodiment of the disclosure.

FIG. 3 is a schematic exploded perspective view illustrating a display part according to an embodiment of the disclosure.

Referring to FIG. 3, a display part DU may be included in the display device DD (e.g., refer to FIG. 1) and generate the image IM (e.g., refer to FIG. 1). The display part DU may include the window WM, an anti-reflection layer ARL, a display panel DP, and a circuit board FCB.

The window WM may be disposed on the display panel DP and the anti-reflection layer ARL. The window WM may prevent components of the display part DU from being damaged by an external impact or a scratch applied onto the window WM. A front surface of the window WM may correspond to the display surface IS (e.g., refer to FIG. 1) of the display device DD (e.g., refer to FIG. 1).

The window WM may include an optically transparent insulating material. For example, the window WM may include glass, sapphire, and/or plastic. The window WM may have a single-layered or multi-layered structure. The window WM may further include a functional layer (e.g., an anti-fingerprint layer, a phase control layer, and/or a hard coating layer) disposed on an optically transparent layer.

The anti-reflection layer ARL may reduce a reflectance of external light incident through the window WM. The anti-reflection layer ARL according to an embodiment of the disclosure may include a retarder and/or a polarizer. The retarder may be provided in a film type or a liquid crystal coating type. The retarder may include a $\lambda/2$ retarder and/or a $\lambda/4$ retarder. The polarizer may also be provided in a film type or a liquid crystal coating type. The film type polarizer may include an elongated synthetic resin film, and the liquid crystal coating type polarizer may include liquid crystals arranged in a form (e.g., a predetermined or selectable form). In an embodiment, the retarder and the polarizer may be realized as a single polarizing film. For example, the retarder and the polarizer may be integral with each other to form the single polarizing film.

The anti-reflection layer ARL may further include a polymer film disposed on the retarder or the polarizer. For example, the polymer film may include at least one of polyethylene terephthalate, polyethylene naphthalate, polycarbonate, cyclo-olefin polymer, polyethersulphone, polyarylate, and polyimide. However, the material of the polymer film is not limited to the examples.

The display panel DP according to an embodiment may be, but is not limited to, a light emitting type display panel. For example, the display panel DP may include light emitting elements which emit light independently. For example, the display panel DP may be an organic light emitting display panel, an inorganic light emitting display panel, or a quantum-dot light emitting display panel. An emission layer of the organic light emitting display panel may include an organic light emitting material, and an emission layer of the inorganic light emitting display panel may include an inorganic light emitting material. An emission layer of the quantum-dot light emitting display panel may include quantum dots and/or quantum rods. For convenience of explanation, the display panel DP corresponding to the organic light emitting display panel will be described as an example.

The display panel DP may include a first area AA1, a bending area BA, and a second area AA2, which are arranged in the second direction DR2. For example, the bending area BA may extend from the first area AA1 in the second direction DR2, and the second area AA2 may extend from the bending area BA in the second direction DR2.

The bending area BA may be an area bendable about a bending axis extending in the first direction DR1 at a curvature (e.g., a predetermined or selectable curvature), and the first area AA1 and the second area AA2 may be areas which are not bent but are substantially flat. The bending area BA may be bent, and thus the first area AA1 and the second area AA2 may overlap each other in a plan view in the third direction DR3. For example, since the bending area BA is bent, the second area AA2 of the display panel DP may be located on a rear surface of the display panel DP, which corresponds to the first area AA1.

A width of each of the bending area BA and the second area AA2 in the first direction DR1 may be less than a width of the first area AA1 in the first direction DR1. The width of the bending area BA in the direction parallel to the bending axis may be short, and the bending area BA may be readily bent. However, embodiments of the disclosure are not limited thereto, and in an embodiment, the width of the bending area BA in the first direction DR1 may be substantially equal to the width of the first area AA1 in the first direction DR1.

The display part DU may further include a bending protective layer BPL disposed in the bending area BA of the display panel DP. The bending protective layer BPL may also be disposed on a portion of the first area AA1 and a portion of the second area AA2. The bending protective layer BPL may be bent together with the bending area BA. The bending protective layer BPL may protect the bending area BA from an external impact and may control a neutral plane of the bending area BA. The bending protective layer BPL may control stress of the bending area BA, and the neutral plane may be adjacent to signal lines disposed in the bending area BA.

The display panel DP may include a display area DA and a non-display area NDA. The display area DA may be defined in the first area AA1. The display area DA may be an area which is activated by an electrical signal to display an image. The display area DA may overlap at least a portion of the aforementioned transmission area TA (e.g., refer to FIG. 1) in a plan view. The image displayed in the display area DA may be visible to the outside through the transmission area TA (e.g., refer to FIG. 1).

The non-display area NDA may be adjacent to the display area DA. For example, the non-display area NDA may be adjacent to (e.g., surround) the display area DA. However, embodiments of the disclosure are not limited thereto, and a shape of the non-display area NDA may be variously modified. The non-display area NDA may correspond to an area including a remaining area of the first area AA1 except the display area DA, the bending area BA, and the second area AA2.

The non-display area NDA may be an area in which a driving circuit and/or driving lines for driving elements disposed in the display area DA, various kinds of signal lines for providing electrical signals to the elements, and pads are disposed. The non-display area NDA defined in the first area AA1 may overlap at least a portion of the bezel area BZA (e.g., refer to FIG. 1) in a plan view. The bezel area BZA (e.g., refer to FIG. 1) may prevent components of the display panel DP disposed in the non-display area NDA from being visible to the outside.

A driving part DIC may be disposed in the second area AA2 of the display panel DP. The driving part DIC may include driving circuits (e.g., a data driving circuit (or data driver)) for driving pixels of the display panel DP. The driving part DIC may be manufactured in an integrated circuit chip shape and the driving part DIC (e.g., a driving chip) may be mounted in the second area AA2.

The circuit board FCB may be disposed adjacent to an end of the second area AA2 of the display panel DP. The circuit board FCB may be spaced apart from the driving part DIC in the second direction DR2. Since the bending area BA is bent, the circuit board FCB may overlap the first area AA1 of the display panel DP in a plan view.

The circuit board FCB may be coupled to the display panel DP by a bonding process. For example, the circuit board FCB may be electrically connected to the display panel DP and the driving part DIC through an anisotropic conductive adhesive layer. The circuit board FCB and the driving part DIC may be electrically connected to each other and control the driving of the display panel DP. Even though not shown in the drawings, the circuit board FCB may be electrically connected to a motherboard of an electronic module included in the display device DD (e.g., refer to FIG. 1) through a connector.

The circuit board FCB may include a board FB and electronic components DEL. In an embodiment, the board FB may be provided as a flexible circuit film. The electronic components DEL may be mounted on the board FB. The electronic components DEL may include electronic elements for converting signals inputted from the outside into signals required for the driving part DIC and/or signals required for driving the display panel DP.

The display part DU may further include a cover film CIC disposed in the second area AA2 of the display panel DP. The cover film CIC may cover the driving part DIC disposed on the display panel DP and an end of the circuit board FCB disposed in the second area AA2. In an embodiment, the cover film CIC may cover a portion of the bending protective layer BPL overlapping a portion of the second area AA2 in a plan view.

One end E-CI of the cover film CIC, which is parallel to the first direction DR1, may be aligned with a boundary between the bending area BA and the second area AA2. For example, the cover film CIC may be disposed in the second area AA2 and may extend from the flat second area AA2 to the boundary of the bending area BA at which the bending starts. The cover film CIC according to an embodiment of the disclosure may relieve (or decrease) the stress of the bending area BA, as compared with a case in which the one end E-CI of the cover film CIC is spaced apart from the boundary between the bending area BA and the second area AA2 by a distance (e.g., a predetermined or selectable distance).

The cover film CIC may be a film having conductivity or including a conductive layer. The cover film CIC may prevent the driving part DIC and electronic elements disposed adjacent to the driving part DIC from being damaged by static electricity. In an embodiment, the cover film CIC may be provided in a tape shape. For example, the cover film CIC may include an adhesive layer at a surface thereof and may be adhered onto the second area AA2 of the display panel DP. However, the embodiment of the cover film CIC is not limited thereto.

The display part DU may further include a lower protective layer PLL disposed on a rear surface of the display panel DP to protect the display panel DP. The lower protective layer PLL may include a first film FI1, a second film FI2, a cover layer CPN, and a spacer CSP. The first film FI1, the cover layer CPN, and the spacer CSP may overlap the first area AA1 in a plan view and may be sequentially stacked on the rear surface of the display panel DP corresponding to the first area AA1. The second film FI2 may overlap the second area AA2 in a plan view.

The first film FI1 and the second film FI2 may be disposed on a same layer on the rear surface of the display panel DP. For example, before the bending area BA is bent, the first film FI1 and the second film FI2 may be arranged in the second direction DR2. The first film FI1 and the second film FI2 may protect the rear surface of the display panel DP and may reinforce the impact resistance of the display panel DP.

Each of the first film FI1 and the second film FI2 may include a flexible plastic material. For example, each of the first film FI1 and the second film FI2 may include at least one of polyethylene terephthalate and polyimide. However, the materials of the first film FI1 and the second film FI2 are not limited to the examples.

The first film FI1 and the second film FI2 may include a same material. A portion corresponding to the bending area BA may be removed from a single film covering the rear surface (e.g., an entire area of the rear surface) of the display panel DP, and the first film FI1 and the second film FI2 may be formed. However, embodiments of the disclosure are not limited thereto.

The first film FI1 and the second film FI2 may be spaced apart from each other with the bending area BA disposed therebetween on the rear surface of the display panel DP. In another embodiment, when the first film FI1 or the second film FI2 is disposed under the bending area BA, thicknesses of components of the display part DU corresponding to the bending area BA of the display panel DP may be increased, and flexibility of the bending area BA may be deteriorated. However, in the embodiment of the disclosure, since the first film FI1 and the second film FI2 are not disposed under the bending area BA, the bending area BA may be readily bent.

The cover layer CPN may have high resistance to compressive force caused by external pressing. Thus, the cover layer CPN may prevent deformation of the display panel DP. The cover layer CPN may include a flexible plastic material such as polyethylene terephthalate and/or polyimide. However, the material of the cover layer CPN is not limited to the examples.

In an embodiment, the cover layer CPN may be a colored film having a low light transmittance. For example, the cover layer CPN may be a black synthetic resin film. The cover layer CPN may absorb light incident from the outside. Thus, components disposed under the cover layer CPN may not be visible due to the cover layer CPN through the window WM.

The cover layer CPN may further include a functional layer (e.g., a heat dissipation layer) disposed under the synthetic resin film. For example, the cover layer CPN may include the heat dissipation layer including at least one of graphite, copper (Cu), and aluminum (Al), which have excellent heat dissipation characteristics. The heat dissipation layer may have the heat dissipation characteristics, and may further have electromagnetic shielding and/or absorbing characteristics.

The spacer CSP may protect the display panel DP from an external impact transmitted under the display panel DP. The spacer CSP may include a material softer than the cover layer CPN. A modulus of the spacer CSP may be less than a modulus of the cover layer CPN. Thus, the spacer CSP may absorb the external impact applied to the display panel DP.

In an embodiment, the spacer CSP may include foam. For example, the spacer CSP may be provided as a synthetic resin layer including pores. For example, the synthetic resin layer may include at least one of acrylonitrile butadiene styrene copolymer (ABS), polyurethane (PU), polyethylene (PE), ethylene vinyl acetate (EVA), and polyvinyl chloride (PVC). However, the material of the spacer CSP is not limited to the examples.

The components of the lower protective layer PLL may be coupled to each other by an adhesive layer. For example, the adhesive layer may include at least one of a pressure sensitive adhesive (PSA), an optical clear adhesive (OCA), and an optical clear resin (OCR). However, the material of the adhesive layer is not limited to the examples but may include various adhesives. However, embodiments of the disclosure are not limited thereto, and in an embodiment, at least some of the components of the lower protective layer PLL may be formed (e.g., directly formed) by a continuous process without the adhesive layer.

Impact resistance of the display panel DP may be improved by the lower protective layer PLL. The arrangement and lengths of the components of the lower protective layer PLL may be adjusted to relieve the stress of the bending area BA and to reinforce strength in the bending area BA.

In case that the bending area BA is bent, the cover layer CPN and the spacer CSP may be disposed between the first film FI1 and the second film FI2. A length of each of the cover layer CPN and the spacer CSP in the second direction DR2 may be less than a length of the first area AA1 in the second direction DR2. Thus, in case that the bending area BA is bent, the cover layer CPN and the spacer CSP may be spaced apart from the bending area BA of the display panel DP, and interference or contact applied to the bending area BA may be prevented.

The length of the cover layer CPN in the second direction DR2 may be less than a length of the first film FI1 in the second direction DR2 and the length of the spacer CSP in the second direction DR2. For example, the spacer CSP may have the modulus less than the modulus of the cover layer CPN and protrude from the cover layer CPN in the second direction DR2. The spacer CSP may be more adjacent to the bending area BA than the cover layer CPN. Thus, the stress applied to the bending area BA may be relieved. Detailed description of the lower protective layer PLL is provided below in more detail.

The display part DU may further include an input sensor disposed on the display panel DP to sense an external input. The input sensor may be disposed (e.g., directly disposed) on the display panel DP through a continuous process or may be coupled onto the display panel DP by an adhesive layer after being manufactured by an additional process. The input sensor may sense the external input (e.g., a touch event) and may obtain coordinate information of the external input. The input sensor may be driven by, but not limited to, at least one of various methods such as a capacitive method, a resistive film method, an infrared method, and a pressure method.

Figure 4:
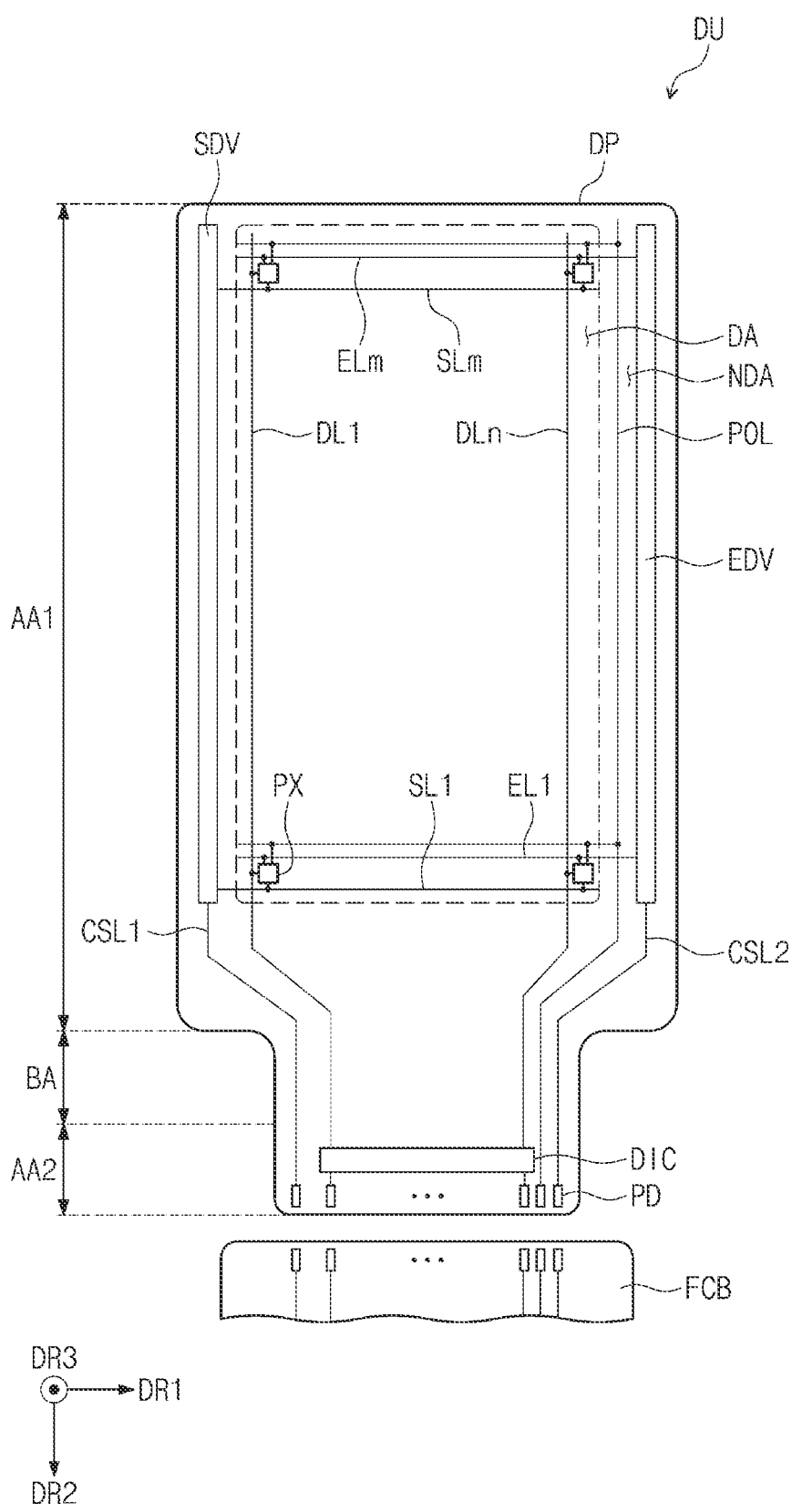
FIG. 4 is a schematic plan view illustrating a display part according to an embodiment of the disclosure.

FIG. 4 is a schematic plan view illustrating a display part according to an embodiment of the disclosure. FIG. 4 schematically illustrates some of the components of the display part DU of FIG. 3.

Referring to FIG. 4, the display panel DP may include the first area AA1, the bending area BA, and the second area AA2, which are arranged in the second direction DR2. The display area DA of the display panel DP may be defined in the first area AA1. A remaining area of the first area AA1 except the display area DA, the bending area BA, and the second area AA2 may be defined as the non-display area NDA. The aforementioned descriptions may be applied to each of the areas.

The display panel DP may include pixels PX disposed in the display area DA and signal lines SL1 to SLm, DL1 to DLn, EL1 to ELm, CSL1, CSL2, and POL electrically connected to the pixels PX. The display panel DP may include pads PD, a scan driver SDV, and an emission driver EDV, which are disposed in the non-display area NDA.

Each of the pixels PX may include a light emitting element and a pixel driving circuit. The pixel driving circuit may include transistors (e.g., a switching transistor, a driving transistor, etc.) electrically connected to the light emitting element and a capacitor. Each of the pixels PX may emit light in response to an electrical signal applied to each of the pixels PX.

The signal lines SL1 to SLm, DL1 to DLn, EL1 to ELm, CSL1, CSL2, and POL may include scan lines SL1 to SLm, data lines DL1 to DLn, emission lines EL1 to ELm, first and second control lines CSL1 and CSL2, and a power line POL. The characters 'm' and 'n' denote natural numbers. Each of the pixels PX may be electrically connected to a corresponding one of the scan lines SL1 to SLm and a corresponding one of the data lines DL1 to DLn. Various kinds of signal lines may be provided in the display panel DP in accordance with the configuration of the pixel driving circuit of the pixel PX.

The scan lines SL1 to SLm may extend in the first direction DR1 and may be electrically connected to the scan driver SDV. The data lines DL1 to DLn may extend in the second direction DR2 and may be electrically connected to the driving part DIC through the bending area BA. The emission lines EL1 to ELm may extend in the first direction DR1 and may be electrically connected to the emission driver EDV.

The power line POL may extend in the second direction DR2 and may be disposed between the display area DA and the emission driver EDV. However, embodiments of the disclosure are not limited thereto, and in an embodiment, the power line POL may be disposed between the display area DA and the scan driver SDV. The power line POL may extend into the second area AA2 through the bending area BA. The power line POL may be electrically connected to a corresponding one of the pads PD disposed in a bottom end portion of the second area AA2 and may receive a voltage. The power line POL may provide a reference voltage to the pixels PX through connection lines.

The pads PD may be arranged in a direction in the second area AA2. The pads PD may be arranged in the first direction DR1 and may be disposed adjacent to an end of the second area AA2, which extends in the first direction DR1. The pads PD may be electrically connected to the circuit board FCB. Each of the pads PD may be electrically connected to a corresponding one of the signal lines SL1 to SLm, DL1 to DLn, EL1 to ELm, CSL1, CSL2, and POL. In FIG. 4, each of the pads PD may be electrically connected to a corresponding one of the first and second control lines CSL1 and CSL2, the data lines DL1 to DLn, and the power line POL.

The first control line CSL1 may be electrically connected to the scan driver SDV. The second control line CSL2 may be electrically connected to the emission driver EDV. The first and second control lines CSL1 and CSL2 may extend from the first area AA1 into the second area AA2 through the bending area BA and may be electrically connected to corresponding ones of the pads PD, respectively. The data lines DL1 to DLn may extend from the first area AA1 into the second area AA2 through the bending area BA and may be electrically connected to the driving part DIC. The driving part DIC may be electrically connected to the pads PD corresponding to the data lines DL1 to DLn, respectively.

The circuit board FCB may be electrically connected to the pads PD and control operations of the scan driver SDV, the emission driver EDV, and the driving part DIC. For example, the circuit board FCB may include output pads corresponding to the pads PD, respectively, and the output pads may be electrically connected to the pads PD through an anisotropic conductive adhesive layer. However, embodiments of the disclosure are not limited thereto, and in other embodiments, the circuit board FCB may be coupled to the pads PD by at least one of other various coupling methods (e.g., a solder bonding method and an ultrasonic bonding method) capable of realizing electrical connection.

A timing controller may be mounted on the circuit board FCB, and the timing controller may generate a scan control signal, a data control signal, and an emission control signal in response to control signals received from the outside thereof.

The scan driver SDV may generate scan signals in response to the scan control signal. The scan signals may be applied to the pixels PX through the scan lines SL1 to SLm. The data driver of the driving part DIC may generate data voltages corresponding to image signals in response to the data control signal. The data voltages may be applied to the pixels PX through the data lines DL1 to DLn. The emission driver EDV may generate emission signals in response to the emission control signal. The emission signals may be applied to the pixels PX through the emission lines EL1 to ELm.

The pixels PX may receive the data voltages in response to the scan signals. The pixels PX may emit lights of brightnesses corresponding to the data voltages in response to the emission signals, thereby displaying an image. For example, the brightnesses of the lights emitted by the pixels PX may be changed based on the data voltages in response to the emission signals. Emission times of the pixels PX may be controlled by the emission signals. The display panel DP may output the image through the display area DA by the pixels PX.

The signal lines (e.g., the first and second control lines CSL1 and CSL2, the data lines DL1 to DLn, the power line POL, or the like) extending from the first area AA1 to the second area AA2 may be disposed in the bending area BA of the display panel DP. The bending protective layer BPL (e.g., refer to FIG. 3) described above may cover the bending area BA and prevent the signal lines disposed in the bending area BA from being damaged by an external impact.

Figure 5:
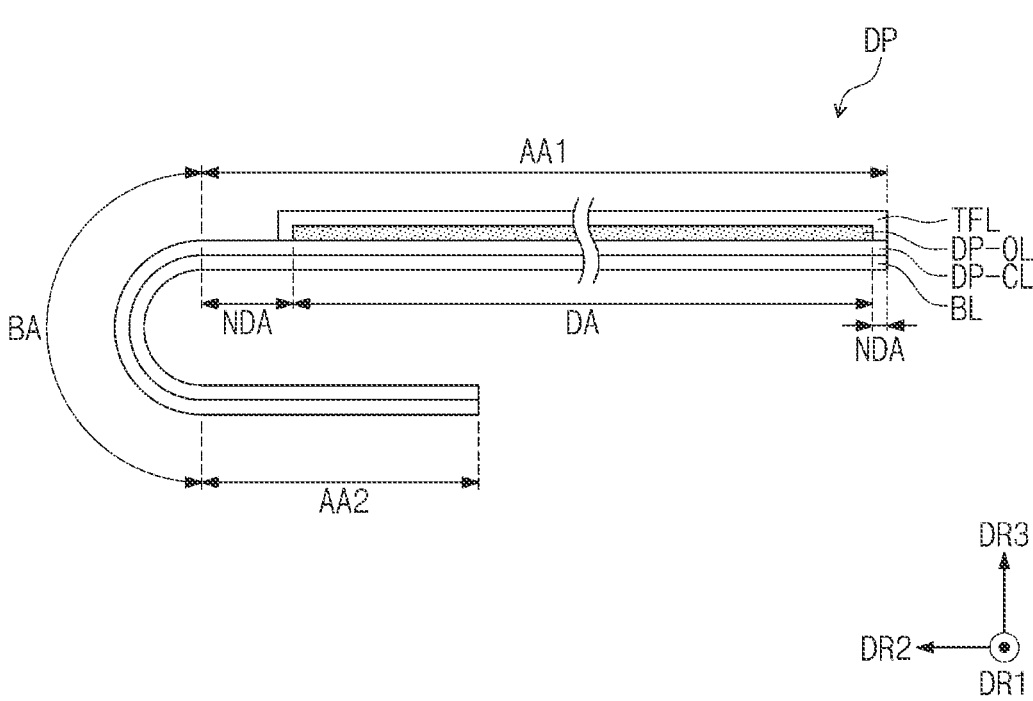
FIG. 5 is a schematic cross-sectional view illustrating a display panel according to an embodiment of the disclosure.

FIG. 5 is a schematic cross-sectional view illustrating a display panel according to an embodiment of the disclosure. FIG. 5 illustrates a cross-sectional view of the display panel DP of which the bending area BA is bent about the bending axis parallel to the first direction DR1. The first area AA1 of FIG. 5 is divided into the display area DA and the non-display area NDA for the purpose of ease and convenience in explanation.

Referring to FIG. 5, the display panel DP may include the first area AA1, the bending area BA, and the second area AA2. The areas AA1, BA, and AA2 may be the same as described above, and detailed description of the same constituent elements is omitted. The display panel DP may include a base layer BL, a circuit element layer DP-CL, a display element layer DP-OL, and an encapsulation layer TFL.

The base layer BL may provide a base surface on which the components (e.g., the circuit element layer DP-CL, the display element layer EP-OL, the encapsulation layer TEL, or the like) of the display panel DP are disposed. Areas corresponding to the first area AA1, the bending area BA, and the second area AA2 of the display panel DP may be defined in the base layer BL. A portion of the base layer BL corresponding to the bending area BA may be bent at a curvature (e.g., a predetermined or selectable curvature). A portion of the base layer BL corresponding to the second area AA2 may overlap a portion of the base layer BL corresponding to the first area AA1 in a plan view. For example, in case that a portion of the bending area BA is bent, the portion of the base layer BL corresponding to the second area AA2 may overlap the portion of the base layer BL corresponding to the first area AA1. Thus, a rear surface of the base layer BL corresponding to the first area AA1 may face a rear surface of the base layer BL corresponding to the second area AA2.

The base layer BL may include a flexible plastic material. For example, the base layer BL may include at least one of an acrylate-based resin, a methacrylate-based resin, a poly-isoprene-based resin, a vinyl-based resin, an epoxy-based resin, a urethane-based resin, a cellulose-based resin, a siloxane-based resin, a polyamide-based resin, a perylene-based resin, and a polyimide-based resin. However, the material of the base layer BL is not limited to the examples.

The circuit element layer DP-CL may be disposed on the base layer BL. The circuit element layer DP-CL may include insulating layers, driving elements for driving the pixels PX (e.g., refer to FIG. 4), the signal lines (e.g., the scan lines SL1 to SLm, the data lines DL1 to DLn, and the emission lines EL1 to ELm), and the pads PD. At least some of the signal lines included in the circuit element layer DP-CL may extend from the first area AA1 to the second area AA2 through the bending area BA. At least one of the insulating layers included in the circuit element layer DP-CL may extend from the first area AA1 so as to be disposed in the bending area BA and the second area AA2.

The display element layer DP-OL may be disposed on the circuit element layer DP-CL. The display element layer DP-OL may be disposed in the first area AA1. The display element layer DP-OL may include light emitting elements disposed in the display area DA of the first area AA1. The light emitting elements of the display element layer DP-OL may be electrically connected to the driving elements of the circuit element layer DP-CL and may output lights corresponding to signals of the driving elements in the display area DA.

The encapsulation layer TFL may be disposed on the display element layer DP-OL and encapsulate or seal the light emitting elements. The encapsulation layer TFL may include thin layers. The thin layers of the encapsulation layer TFL may improve optical efficiency of the light emitting elements and/or may protect the light emitting elements. For example, the thin layers of the encapsulation layer TFL may protect the light emitting elements from moisture, oxygen, or pollution.

The encapsulation layer TFL may include an inorganic layer and/or an organic layer. The inorganic layer of the encapsulation layer TFL may protect the light emitting elements from moisture and/or oxygen. For example, the inorganic layer may include at least one of aluminum oxide, titanium oxide, silicon oxide, silicon nitride, silicon oxynitride, zirconium oxide, and hafnium oxide. However, the material of the inorganic layer is not limited to the examples. The organic layer of the encapsulation layer TFL may protect the light emitting elements from a foreign material (e.g., dust particles or pollution). For example, the organic layer may include an acrylate-based resin. However, the material of the organic layer is not limited to the example.

Figure 6:
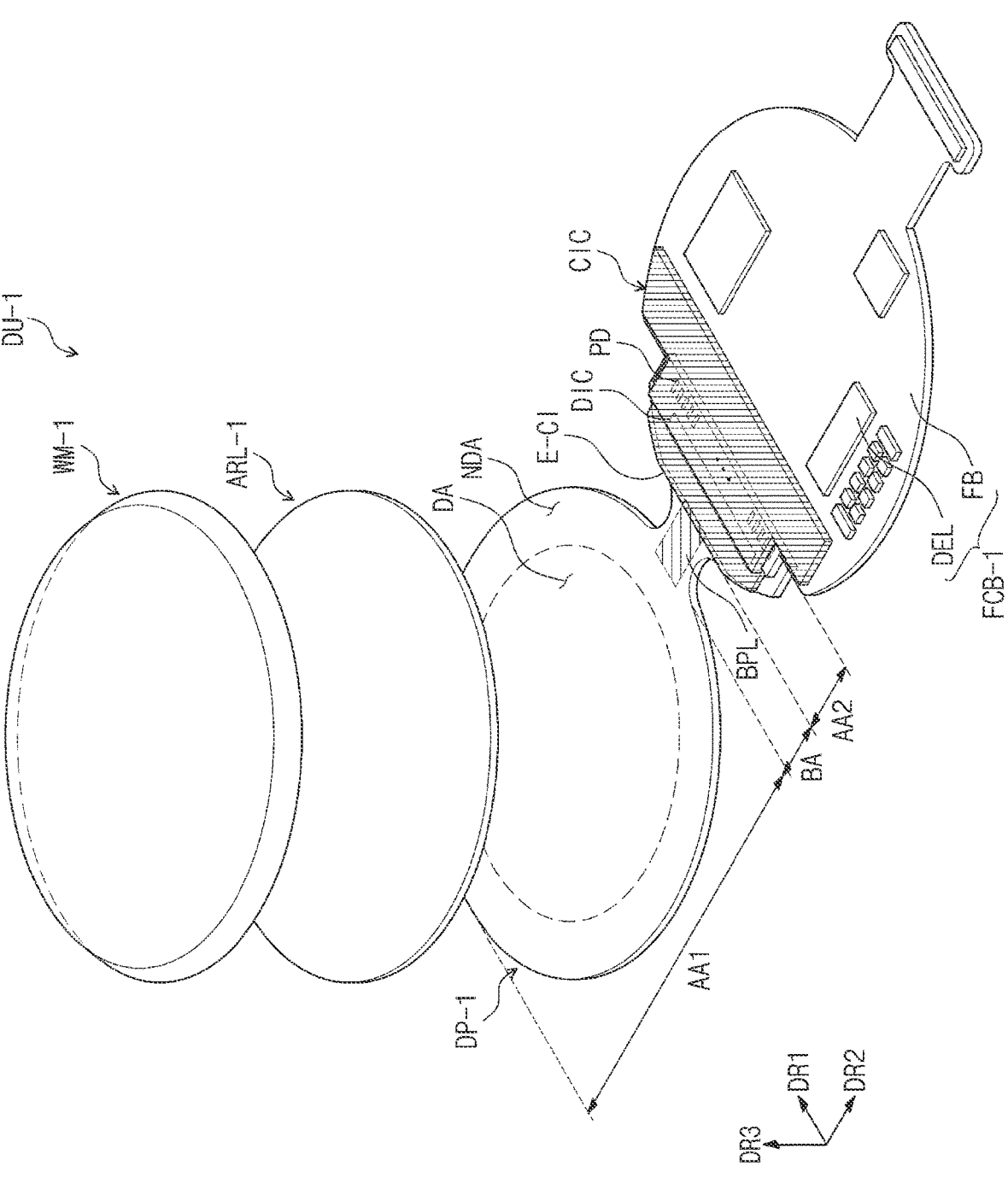
FIG. 6 is a schematic exploded perspective view illustrating a display part according to an embodiment of the disclosure.

FIG. 6 is a schematic exploded perspective view illustrating a display part according to an embodiment of the disclosure.

Referring to FIG. 6, a display part DU-1 may be included in the display device DD-1 (e.g., refer to FIG. 2) and generate the image IM (e.g., refer to FIG. 2). The display part DU-1 may include the window WM-1, an anti-reflection layer ARL-1, a display panel DP-1, and a circuit board FCB-1. The components of the display part DU-1 illustrated in FIG. 6 may have different functions from the components of the display part DU illustrated in FIG. 3 at least in shapes or standards thereof. The components of the display part DU-1 illustrated in FIG. 6 are indicated by the same/similar reference designators as the components of the display part DU illustrated in FIG. 3, and the aforementioned features may be equally applied thereto. Thus, detailed description of the same constituent elements is omitted.

Referring to FIG. 6, the display panel DP-1 may include a first area AA1, a bending area BA, and a second area AA2, which are arranged in the second direction DR2. The first area AA1 of the display panel DP-1 may have a circular shape in a plan view. However, embodiments of the disclosure are not limited thereto, and in other embodiments, the first area AA1 of the display panel DP-1 may have another shape (e.g., an elliptical shape, a rectangular shape, or a square shape), depending on a design of the display part DU-1. A display area DA may be defined in the first area AA1 of the display panel DP-1. Multiple pixels PX (e.g., refer to FIG. 4) may be disposed in the display area DA to output light. A non-display area NDA may be adjacent to (e.g., surround) the display area DA in a plan view.

The bending area BA may extend from the first area AA1. The bending area BA may be bendable about a bending axis extending in a first direction DR1 at a curvature (e.g., a predetermined or selectable curvature). In case that the bending area BA is bent, the first area AA1 and the second area AA2 may overlap each other in a plan view. A width of the bending area BA in the first direction DR1 may be less than a diameter of the first area AA1. The width of the bending area BA in the first direction DR1 may vary toward the second direction DR2 and may be smallest in a central portion of the bending area BA. Thus, the bending area BA may be readily bent. However, embodiments of the disclosure are not limited thereto, and in an embodiment, the width of the bending area BA in the first direction DR1 may be uniform.

A width of the second area AA2 in the first direction DR1 may vary toward the second direction DR2. A shape of the second area AA2 may correspond to a shape of a portion of the first area AA1. The maximum width of the second area AA2 in the first direction DR1 may be less than the diameter of the first area AA1. Thus, in case that the bending area BA is bent, the whole of the second area AA2 may completely overlap the first area AA1 in a plan view.

The anti-reflection layer ARL-1 may be disposed on the display panel DP-1 and may have a shape corresponding to the first area AA1 of the display panel DP-1. The window WM-1 may be disposed on the display panel DP-1 and the anti-reflection layer ARL-1. The window WM-1 may have a shape corresponding to the first area AA1 of the display panel DP-1. The window WM-1 may cover the anti-reflection layer ARL-1 and the display panel DP-1. The window WM-1 may protect the anti-reflection layer ARL-1 and the display panel DP-1 from an external impact or scratch applied onto the window WM-1.

The driving part DIC may be disposed in the second area AA2. The circuit board FCB-1 may be disposed adjacent to an end of the second area AA2 of the display panel DP-1 and may be electrically connected to the pads PD disposed in the second area AA2. The circuit board FCB-1 and the driving part DIC may be electrically connected to each other and provide signals for driving the display panel DP-1. The circuit board FCB-1 may include a board FB and electronic components DEL mounted on the board FB.

The display part DU-1 may further include a cover film CIC disposed in the second area AA2. An end E-CI of the cover film CIC, which is parallel to the first direction DR1, may be aligned with a boundary between the bending area BA and the second area AA2. Thus, stress of the bending area BA may be relieved (or decreased).

The display part DU-1 may further include a bending protective layer BPL disposed in the bending area BA. The bending protective layer BPL may protect components disposed in the bending area BA of the display panel DP-1 from an external impact.

The display part DU-1 according to an embodiment of the disclosure may further include at least one of the components of the aforementioned lower protective layer PLL (e.g., refer to FIG. 3). For example, the display part DU-1 may further include at least one of a first film FI1 (e.g., refer to FIG. 3), a second film FI2 (e.g., refer to FIG. 3), a cover layer CPN (e.g., refer to FIG. 3), and a spacer CSP (e.g., refer to FIG. 3), which are disposed on a rear surface of the display panel DP-1. The lower protective layer PLL (e.g., refer to FIG. 3) may have a shape corresponding to the shape of the display panel DP-1 in which the lower protective layer PLL (e.g., refer to FIG. 3) is disposed. For example, the component of the lower protective layer PLL (e.g., refer to FIG. 3) overlapping the first area AA1 of the display panel DP-1 of FIG. 6 in a plan view may have a circular shape or a shape corresponding to a portion of a circular shape.

Figure 7A:
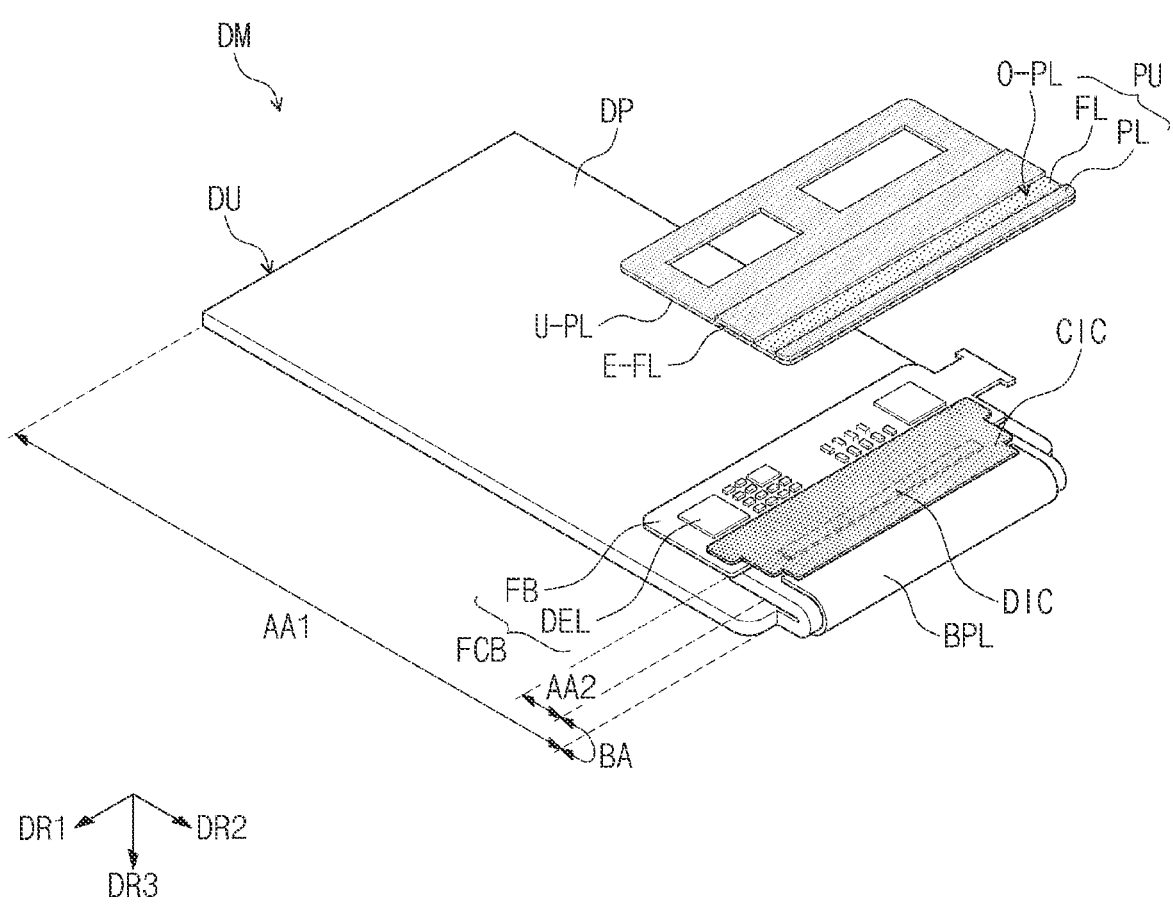
FIG. 7A is a schematic exploded perspective view illustrating a display module according to an embodiment of the disclosure.
Figure 7B:
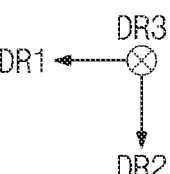
FIG. 7B is a schematic plan view illustrating a display module according to an embodiment of the disclosure.

FIG. 7A is a schematic exploded perspective view illustrating a display module according to an embodiment of the disclosure. FIG. 7B is a schematic plan view illustrating a display module according to an embodiment of the disclosure. FIGS. 7A and 7B respectively illustrate a perspective view and a plan view from a rear surface of a display panel DP.

Referring to FIGS. 7A and 7B, a display module DM may include a display part DU and a protection part PU. Components of the display part DU illustrated in FIGS. 7A and 7B may be substantially the same as described above. Thus, detailed description of the same constituent elements is omitted, and description of the protection part PU is described below.

Referring to FIGS. 7A and 7B, the protection part PU may be disposed on the rear surface of the display panel DP. The protection part PU may be disposed under the display part DU. The protection part PU may protect components of the display part DU vulnerable to an external impact when the display part DU is transferred. According to an embodiment, the protection part PU may be removed when the components of the display part DU are assembled in the case EDC (e.g., refer to FIG. 1). The protection part PU may include a cushion layer FL and a protective film PL.

The protective film PL may include a top surface U-PL facing a back surface of the display panel DP. The top surface U-PL of the protective film PL may face the second area AA2 of the bent display panel DP and the circuit board FCB. For example, the second area AA2 of the bent display panel DP and the circuit board FCB disposed in the second area AA2 may be located between the first area AA1 and the protective film PL in a cross-sectional view.

The protective film PL may include an opening O-PL penetrating the protective film PL. For example, the opening O-PL of the protective film PL may be a groove on the cushion layer FL. The opening O-PL of the protective film PL may overlap the bending area BA of the bent display panel DP in a plan view. The opening O-PL of the protective film PL may overlap at least a portion of the second area AA2 of the display panel DP in a plan view. The protective film PL may have the opening O-PL corresponding to the bending area BA. Thus, even though the protective film PL is deformed by an external impact in a process of transferring the display part DU, the deformation of the protective film PL may be prevented from affecting the bending area BA of the display panel DP. For example, the bending area BA of the display panel DP may not be affected by the deformation of the protective film PL although the protective film PL is deformed by the external impact in the process of the transferring the display part DU.

As illustrated in FIGS. 7A and 7B, the opening O-PL of the protective film PL may extend in the first direction DR1 to ends (e.g., both ends) of the protective film PL, which are parallel to the second direction DR2. Thus, the protective film PL may include film portions spaced apart from each other with the opening O-PL disposed therebetween. For example, the opening O-PL may be disposed between the film portions of the protective film PL. However, embodiments of the disclosure are not limited thereto, and the opening O-PL may have another shape overlapping the bending area BA of the display panel DP in a plan view. For example, the opening O-PL may be located within the protective film PL in a plan view and may be adjacent to (e.g., surrounded by) the protective film PL in a plan view.

The protective film PL may include a polymer film capable of being readily molded and manufactured. The protective film PL may include a material capable of being manufactured in a small size. For example, the protective film PL may include a polyethylene terephthalate film. Thus, the protective film PL may be readily molded or formed to have a design corresponding to the shape of the display part DU. If the component of the protection part PU is formed of a plastic material of polycarbonate, due to properties of the material, a minimum area for injection may be required, and it may be difficult to manufacture the protection part PU having a small size. However, in the embodiment of the disclosure, the protection part PU according to the embodiment of the disclosure may include the polyethylene terephthalate film as the protective film PL. Thus, the protection part PU which has a small size and is suitable for the display part DU having a small size may be readily manufactured. A manufacturing cost of the protection part PU may be reduced.

The protective film PL may overlap the driving part DIC disposed in the second area AA2 and at least a portion of the circuit board FCB in a plan view. For example, the protective film PL may cover at least a portion of a border (or edge) of the board FB of the circuit board FCB. The protective film PL may be provided as a film in which an adhesive layer is disposed on the top surface U-PL. Thus, the protective film PL may fix the circuit board FCB onto the rear surface of the display panel DP and may prevent the circuit board FCB from being damaged by shaking in the transferring process. The protective film PL may expose the electronic components DEL of the circuit board FCB. In another embodiment, the protective film PL may be lifted or delaminated if the protective film PL covers the electronic components DEL. However, the protective film PL may be spaced apart from the electronic components DEL in the embodiment of the disclosure. Thus, the lifting or delamination of the protective film PL may be prevented.

The cushion layer FL may be disposed on the top surface U-PL of the protective film PL. The cushion layer FL may be located between the second area AA2 of the bent display panel DP and the protective film PL in a cross-sectional view. The cushion layer FL may cover the opening O-PL (e.g., an entire area of the opening O-PL) of the protective film PL. The cushion layer FL may cover the opening O-PL and protect the bending area BA of the display panel DP, which is exposed by the protective film PL.

The cushion layer FL may overlap the bending area BA and the second area AA2 in a plan view. Thus, the cushion layer FL may protect the bending area BA of the display panel DP and the driving part DIC disposed in the second area AA2, which are vulnerable to an external impact. The cushion layer FL may include foam. For example, the cushion layer FL may be provided as a synthetic resin layer including pores.

One end E-FL of the cushion layer FL, which is parallel to the first direction DR1, may be disposed in the second area AA2. The end E-FL of the cushion layer FL may be aligned with an end of the second area AA2, which is parallel to the first direction DR1. However, embodiments of the disclosure are not limited thereto, and in an embodiment, the end E-FL of the cushion layer FL may be located inside the end of the second area AA2 in a plan view.

The cushion layer FL may not overlap a remaining portion of the circuit board FCB except a portion of the circuit board FCB disposed in the second area AA2 in a plan view. The protective film PL may cover the end E-FL of the cushion layer FL and a portion of the board FB not overlapping the electronic components DEL in a plan view. For example, the protective film PL may have an opening exposing the electronic components DEL. Thus, the protective film PL may be adhered to the board FB of the circuit board FCB and may stably fix the circuit board FCB in the transferring process.

Figure 8:
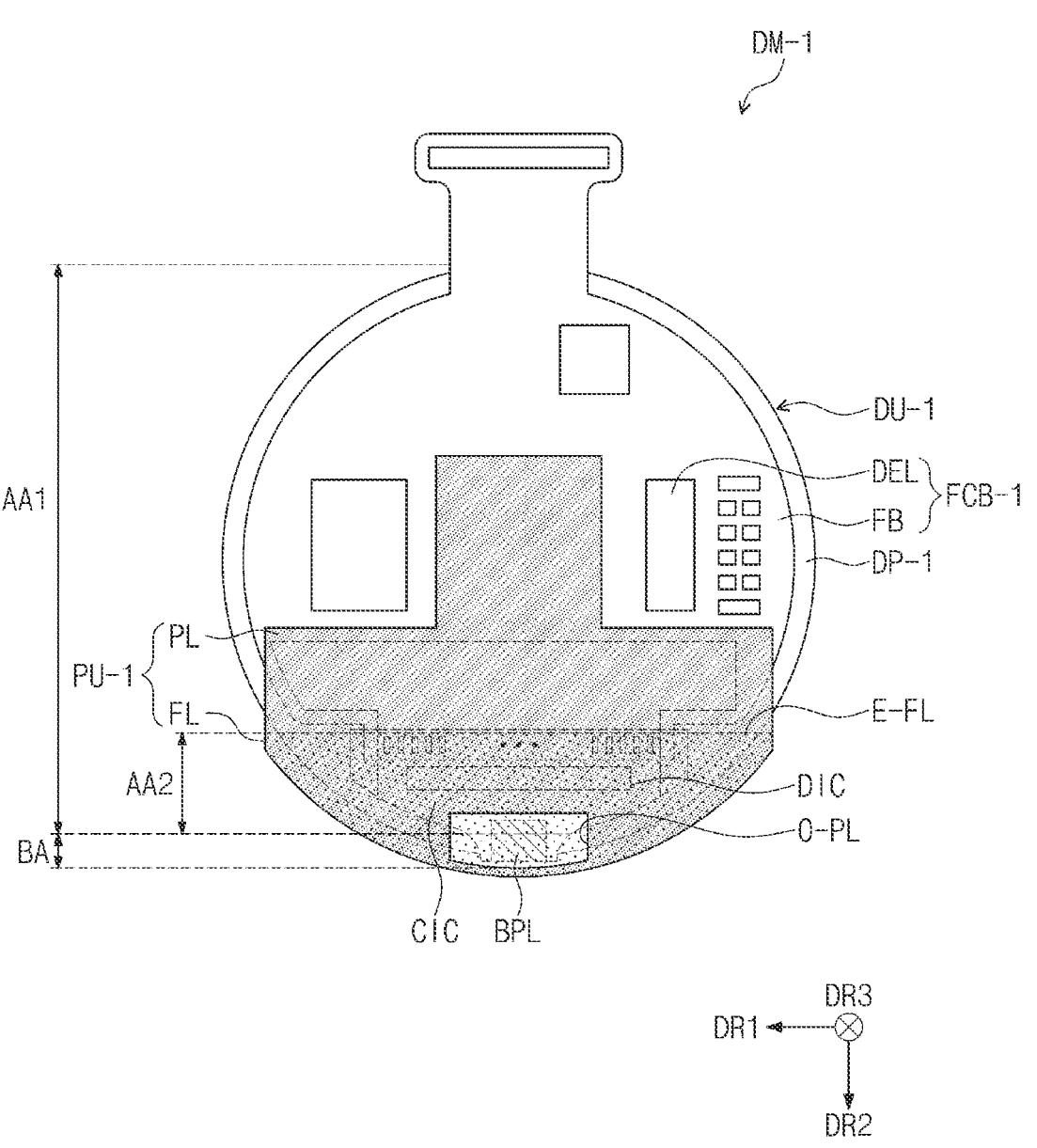
FIG. 8 is a schematic plan view illustrating a display module according to an embodiment of the disclosure.

FIG. 8 is a schematic plan view illustrating a display module according to an embodiment of the disclosure.

Referring to FIG. 8, a display module DM-1 may include a display part DU-1 and a protection part PU-1 disposed under the display part DU-1 and protect the display part DU-1. Components of the display module DM-1 illustrated in FIG. 8 may have different functions from the components of the display module DM illustrated in FIG. 7B at least in shapes or standards thereof. The aforementioned features may be equally applied to components of the display part DU-1 illustrated in FIG. 8.

Referring to FIG. 8, the protection part PU-1 may include a cushion layer FL and a protective film PL, which are disposed on a rear surface of the display panel DP-1. The cushion layer FL and the protective film PL may have shapes corresponding to components of the display part DU-1 in need of protection. For example, the cushion layer FL and the protective film PL may cover and protect the components of the display part DU-1.

The protective film PL may include an opening O-PL penetrating the protective film PL. The opening O-PL of the protective film PL may overlap the bending area BA of the display panel DP-1 in a plan view. The opening O-PL may be adjacent to (e.g., surrounded by) the protective film PL in a plan view.

The protective film PL may include a material capable of being manufactured in a small size. For example, the protective film PL may include a polyethylene terephthalate film. Thus, the protective film PL may be manufactured to have a small size suitable for a size of the small display part DU-1.

The protective film PL may overlap the driving part DIC disposed in the second area AA2 and at least a portion of the circuit board FCB-1 in a plan view. The protective film PL may cover at least a portion of a border (or edge) of the board FB of the circuit board FCB-1 and may fix the circuit board FCB-1 onto the rear surface of the display panel DP-1. Thus, the protective film PL may prevent the circuit board FCB-1 from being damaged by an external impact in a process of transferring the display module DM-1. The protective film PL may be spaced apart from the electronic components DEL of the circuit board FCB-1 and may prevent the protective film PL from being lifted or delaminated by the electronic components DEL.

The cushion layer FL may overlap the bending area BA and the second area AA2 in a plan view and may cover the opening O-PL. The cushion layer FL may absorb an external impact and protect the components disposed in the bending area BA and the second area AA2 of the display panel DP-1. An end E-FL of the cushion layer FL may be disposed in the second area AA2. The end E-FL of the cushion layer FL may be aligned with an end of the second area AA2 parallel to the first direction DR1 or may be located inside the end of the second area AA2 in a plan view.

Referring again to FIGS. 7A to 8, the protection part PU (or PU-1) according to the embodiments of the disclosure may include the protective film PL and the cushion layer FL which are formed of the materials capable of being readily molded or manufactured. Thus, the protection part PU (or PU-1) may be readily manufactured to have an optimized design corresponding to the design of the display part DU (or DU-1). The protection part PU (or PU-1) may be manufactured to have a simple design, and mass production of the protection part PU (or PU-1) may be improved. The protection part PU (or PU-1) according to the embodiments of the disclosure may have at least one of various shapes capable of protecting the driving part DIC and the circuit board FCB (or FCB-1) disposed in the bending area BA and the second area AA2 of the display part DU or DU-1.

The cushion layer FL of the protection part PU (or PU-1) according to the embodiments of the disclosure may protect the bending area BA of the display panel DP (or DP-1) and the driving part DIC disposed in the second area AA2 of the display panel DP (or DP-1) from an external impact occurring in the process of transferring the display part DU (or DU-1). The protective film PL of the protection part PU (or PU-1) according to the embodiments of the disclosure may have the opening O-PL corresponding to the bending area BA and prevent the protective film PL from affecting the bending area BA even though the protective film PL is deformed by an external impact.

Figure 9A:
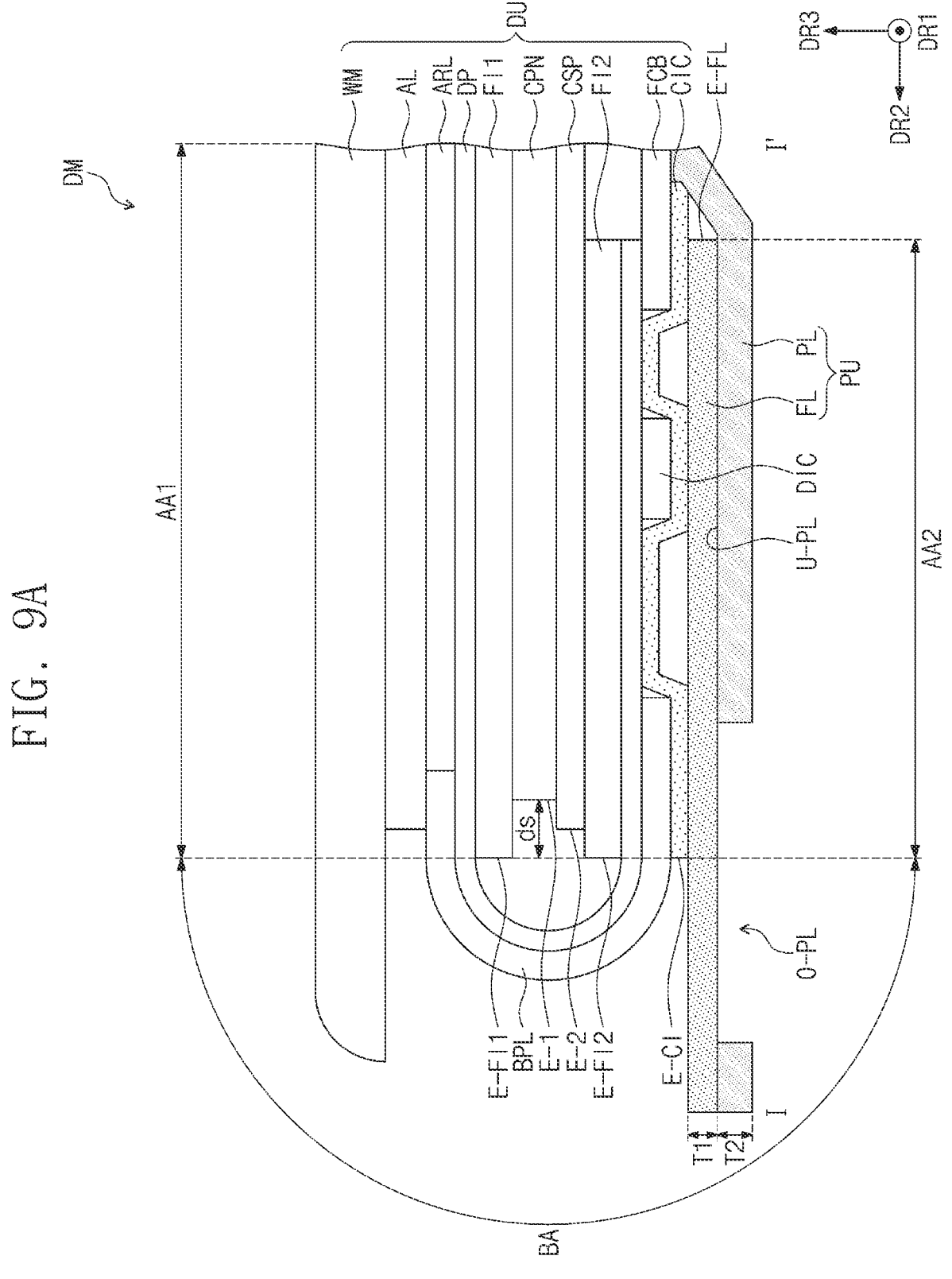
FIG. 9A is a schematic cross-sectional view taken along line I-I' of FIG. 7B to illustrate a display module according to an embodiment of the disclosure.
Figure 9B:
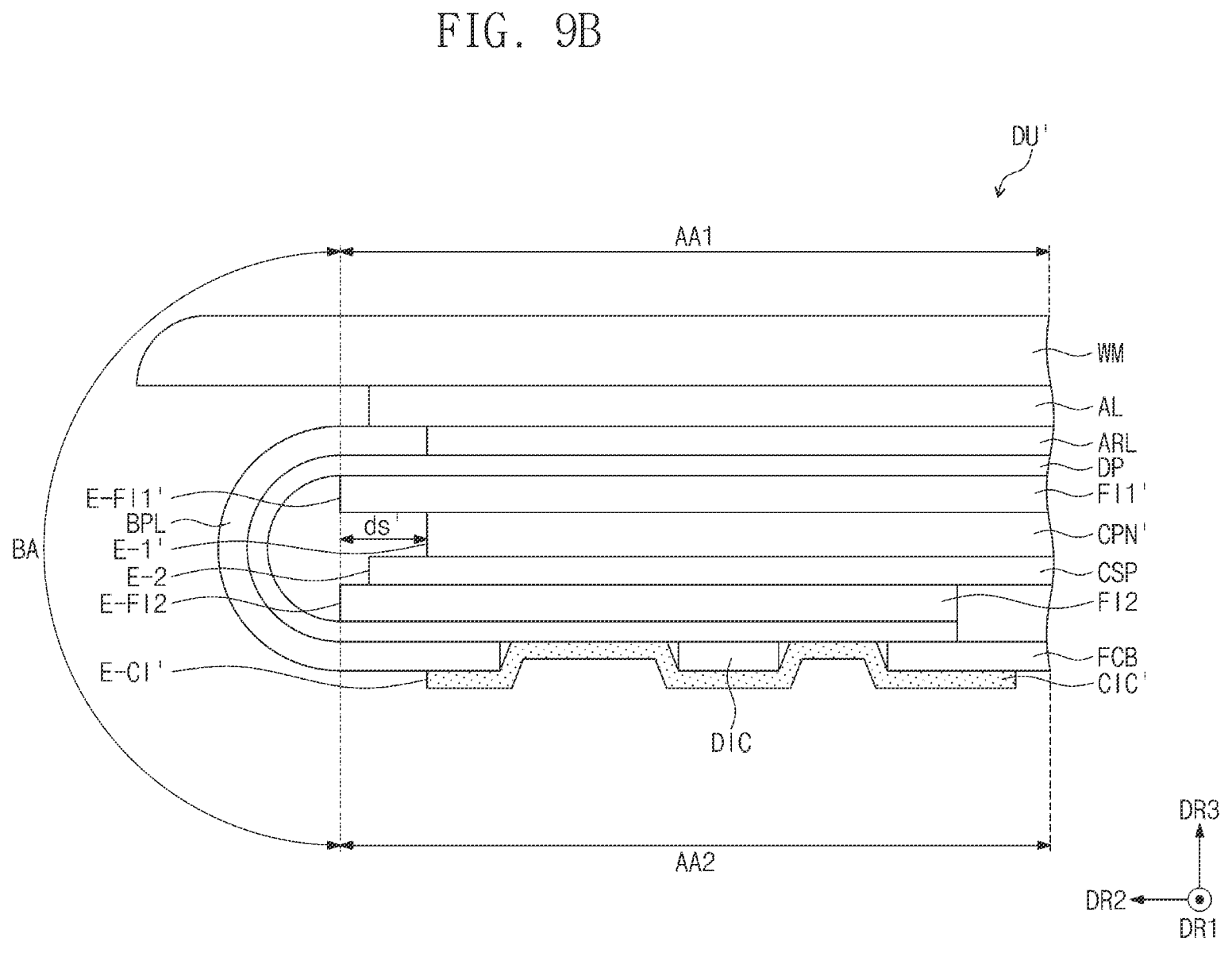

FIG. 9A is a schematic cross-sectional view taken along line I-I' of FIG. 7B to illustrate a display module according to an embodiment of the disclosure. FIG. 9B is a schematic cross-sectional view illustrating a display part according to a comparative example. The aforementioned descriptions may be equally applied to the components of the display module DM illustrated in FIG. 9A.

Referring to FIG. 9A, the window WM and the anti-reflection layer ARL may be coupled to each other by an adhesive layer AL. The adhesive layer AL may include a pressure sensitive adhesive (PSA), an optical clear adhesive (OCA), or an optical clear resin (OCR). However, the material of the adhesive layer AL is not limited to the examples and may include an adhesive.

Referring to FIG. 9A, in case that the bending area BA is bent, the first film FI1, the cover layer CPN, the spacer CSP, and the second film FI2 may be sequentially disposed between the first area AA1 and the second area AA2 of the display panel DP. Since the bending area BA is bent, the second film FI2 disposed on the rear surface of the display panel DP corresponding to the second area AA2 may be located on the rear surface of the spacer CSP.

The cover layer CPN may include a side surface E-1 which corresponds to an end of the cover layer CPN and is adjacent to the bending area BA. In the specification, the side surface E-1 of the cover layer CPN may be defined as a first side surface E-1. The spacer CSP may include a side surface E-2 which corresponds to an end of the spacer CSP and is adjacent to the bending area BA, and the side surface E-2 of the spacer CSP may be defined as a second side surface E-2. The first film FI1 may include a side surface E-FI1 which corresponds to an end of the first film FI1 and is adjacent to the bending area BA, and the side surface E-FI1 of the first film FI1 may be defined as a third side surface E-FI1.

Each of the first side surface E-1, the second side surface E-2, and the third side surface E-FI1 may face the rear surface of the bending area BA in the second direction DR2. The third side surface E-FI1 among the first to third side surfaces E-1, E-2, and E-FI1 may be closest to the bending area BA. The third side surface E-FI1 may protrude more toward the bending area BA than each of the first side surface E-1 and the second side surface E-2. For example, the third side surface E-FI1 may protrude from each of the first side surface E-1 and the second side surface E-2 in the second direction DR2. Each of the first side surface E-1 and the second side surface E-2 may be spaced apart from the bending area BA.

The third side surface E-FI1 and the first side surface E-1 may be spaced apart from each other in the second direction DR2 by a distance ds. As the distance ds decreases, stress applied to the bending area BA may decrease. However, if the distance ds is 0 (zero) or the first side surface E-1 protrudes more toward the bending area BA than the third side surface E-FI1, the first side surface E-1 may contact the bending area BA and damage the bending area BA in case that the bending area BA is bent. Thus, the distance ds may be designed to have a minimum distance capable of preventing the first side surface E-1 from interfering with the bending area BA and of reducing the stress of the bending area BA.

The second side surface E-2 may protrude more toward the bending area BA than the first side surface E-1. For example, the second side surface E-2 may protrude from the first side surface E-1 in the second direction DR2. Since the second side surface E-2 of the spacer CSP having the soft material and the modulus less than a modulus of the cover layer CPN is closer to the bending area BA than the first side surface E-1 of the cover layer CPN, the stress of the bending area BA may be reduced or relieved, and the strength in the bending area BA may be reinforced. For example, the second side surface E-2 of the spacer CSP may have the soft material, and the modulus of the spacer CSP may be softer than the modulus of the cover layer CPN. The second side surface E-2 of the spacer CSP may be closer to the bending area BA than the first side surface E-1 of the cover layer CPN. Thus, the stress of the bending area BA may be reduced, and the bending area BA may be reinforced.

The second film FI2 may include a fourth side surface E-FI2 which corresponds to an end of the second film FI2 and is adjacent to the bending area BA. The fourth side surface E-FI2 of the second film FI2 may be aligned with the third side surface E-FI1 of the first film FI1. For example, the third side surface E-FI1 of the first film FI1 may be aligned with a boundary between the bending area BA and the first area AA1. The fourth side surface E-FI2 of the second film FI2 may be aligned with a boundary between the bending area BA and the second area AA2. However, embodiments of the disclosure are not limited thereto.

The end E-CI of the cover film CIC may be aligned with the boundary between the bending area BA and the second area AA2 in a cross-sectional view. The cover film CIC may cover the second area AA2 adjacent to the bending area BA, and the stress applied to the bending area BA may be reduced or relieved.

The top surface U-PL of the protective film PL may face the second area AA2 and the circuit board FCB. The cushion layer FL disposed on the top surface U-PL of the protective film PL may be closer to the display part DU than the protective film PL, in an area corresponding to the second area AA2. In an embodiment, the opening O-PL of the protective film PL may overlap the bending area BA and may overlap a portion of the second area AA2 adjacent to the bending area BA in a plan view. The cushion layer FL may cover the opening O-PL of the protective film PL and may protect the bending area BA of the display panel DP.

The end E-FL of the cushion layer FL may be disposed in the second area AA2. The end E-FL of the cushion layer FL may be aligned with the end of the second area AA2 or may be located inside the end of the second area AA2 in a plan view. In an embodiment, the cushion layer FL may have another shape capable of protecting the components of the display part DU disposed in the bending area BA and the second area AA2. The protective film PL may cover the end E-FL of the cushion layer FL and at least a portion of the circuit board FCB A thickness T1 of the cushion layer FL and a thickness T2 of the protective film PL may be designed in consideration of strength required for the protection part PU and a size of the protection part PU. According to an embodiment of the disclosure, the thickness T2 of the protective film PL may be greater than the thickness T1 of the cushion layer FL. For example, the thickness T2 of the protective film PL may be about 1.25 times or greater than the thickness T1 of the cushion layer FL. However, a ratio of the thickness T2 of the protective film PL and the thickness T1 of the cushion layer FL is not limited to the value example.

Referring to FIGS. 9A and 9B, a position of a third side surface E-FI1' of a first film FI1' of the comparative example illustrated in FIG. 9B may be substantially the same as the position of the third side surface E-FI1 of the first film FI1 of the embodiment illustrated in FIG. 9A. However, a distance ds' between a first side surface E-1' of a cover layer CPN' and the third side surface E-FI1' of the first film FI1' in the comparative example illustrated in FIG. 9B may be greater than the distance ds between the first side surface E-1 and the third side surface E-FI1 of the embodiment illustrated in FIG. 9A. As the distance ds' between the first side surface E-1' and the third side surface E-FI1' increases, stress applied to a bending area BA may increase and a possibility of damaging the bending area BA may increase.

Referring to FIG. 9B, an end E-CI' of a cover film CIC' of the comparative example may be located in the second area AA2 and may be spaced apart from a boundary between the bending area BA and the second area AA2 by a distance (e.g., a predetermined or selectable distance). Thus, the cover film CIC' of the comparative example may not cover a portion of the second area AA2 adjacent to the bending area BA. Stress applied to the bending area BA in the comparative example of FIG. 9B may be increased as compared with the embodiment including the cover film CIC illustrated in FIG. 9A.

The following table 1 shows magnitudes of the stress applied to the bending area BA according to the position of the end E-CI of the cover film CIC and the distance ds between the side surfaces E-FI1 and E-1 of the first film FI1 and the cover layer CPN adjacent to the bending area BA. The 'distance' of the table 1 may correspond to the distance ds between the third side surface E-FI1 of the first film FI1 and the first side surface E-1 of the cover layer CPN. The 'maximum stress' of the table 1 shows a maximum value of the stress applied to the bending area BA. The 'ratio' of the table 1 shows a ratio of a maximum stress of the embodiment to a maximum stress (100%) of the comparative example. For example, the 'ratio' corresponds to reduced amount of the stress applied to the bending area BA.

To check a degree of stress reduction according to the distance ds between the third side surface E-FI1 of the first film FI1 and the first side surface E-1 of the cover layer CPN, the cover films of the second to fourth embodiments were formed under the same conditions as the cover film CIC' of the comparative example. For example, an end of the cover film of each of the second to fourth embodiments is spaced apart from the boundary between the bending area BA and the second area AA2 by about 0.2 mm.

In case that the maximum stresses of the comparative example and the second to fourth embodiments are compared with each other, it is recognized that the maximum stress decreases as the distance ds decreases. The distances ds of the second to fourth embodiments are 0.2, 0.19, and 0.15, respectively, and are less than the distance ds' (0.25) of the comparative example. The maximum stresses of the second to fourth embodiments are reduced by about 2%, about 3% and about 6%, respectively. In the second to fourth embodiments, it is recognized that the maximum stress decreases as the distance ds decreases.

Thus, as the distance ds between the third side surface E-FI1 of the first film FI1 and the first side surface E-1 of the cover layer CPN becomes closer to 0 (zero), the stress applied to the bending area BA may be reduced or relieved, and the strength of the bending area BA may be reinforced. However, the cover layer CPN may contact the bending area BA to affect the bending area BA as the distance ds between the third side surface E-FI1 of the first film FI1 and the first side surface E-1 of the cover layer CPN becomes closer to 0 (zero), and thus the distance ds between the third side surface E-FI1 of the first film FI1 and the first side surface E-1 of the cover layer CPN may be in a range of about 0.2 mm to about 0.1 mm.

TABLE 1

| Classification | Comparative example | First embodiment | Second embodiment | Third embodiment | Fourth embodiment |
|---|---|---|---|---|---|
| Distance (mm) | 0.25 | 0.25 | 0.20 | 0.19 | 0.15 |
| Maximum stress (MPa) | 166.1 | 146.6 | 162.2 | 161.1 | 156.7 |
| Ratio | 100% | 88% | 98% | 97% | 94% |

The comparative example may correspond to a display part DU' illustrated in FIG. 9B. In the comparative example, the end E-CI' of the cover film CIC' is spaced apart from the boundary between the bending area BA and the second area AA2 by about 0.2 mm.

The first embodiment may correspond to the display part DU illustrated in FIG. 9A. For example, in the first embodiment, the end E-CI of the cover film CIC is aligned with the boundary between the bending area BA and the second area AA2.

The distances ds' and ds of the comparative example and the first embodiment were equal to each other to check a degree of the stress of the bending area BA reduced by the cover film CIC. When the maximum stresses of the comparative example and the first embodiment are compared with each other, it is recognized that the stress of the bending area BA of the first embodiment is reduced by about 12% as compared with the comparative example. Thus, since the end E-CI of the cover film CIC is aligned with the boundary between the bending area BA and the second area AA2, the stress of the bending area BA may be reduced or relieved, and the strength of the bending area BA may be reinforced.

The protection part according to the embodiment may include the cushion layer and the protective film. The cushion layer may overlap the bending area and the second area of the display panel in a plan view, and the protective film may be disposed under the cushion layer and include the opening corresponding to the bending area. In the process of transferring the display part, the cushion layer of the protection part may prevent the bending area of the display panel from being damaged by an external impact and may protect the bending area. The protective film of the protection part may have the opening corresponding to the bending area of the display panel. Thus, even though the protective film is damaged by an external impact in the process of transferring the display part, it is possible to prevent the damage of the protective film from affecting the bending area of the display panel.

Since the protection part according to the embodiment is formed of the material capable of being readily manufactured, the protection part having a simple design may be readily manufactured, and a manufacturing cost of the protection part may be reduced.

The display part according to the embodiment may include the cover film covering the driving part disposed in the second area. An end of the cover film may be aligned with the boundary between the second area and the bending area. Thus, the cover film may relieve or reduce the stress applied to the bending area of the display panel and may reinforce the strength of the bending area.

The display part according to the embodiment may include the cover layer and the spacer which are disposed on the rear surface of the display panel. The cover layer and the spacer may be spaced apart from the bending area and prevent an impact or interference applied to the bending area. The spacer of the display part according to the embodiment may be formed of the soft material, and the end of the spacer may protrude to be closer to the bending area than the end of the cover layer. Thus, the stress applied to the bending area may be reduced or relieved, and the strength of the bending area may be reinforced.

The display module including the protection part and the display part according to the embodiment may reduce or prevent damage or failure of the display part which occurs in the transferring process and may improve reliability.

The display part of the disclosure may relieve or reduce the stress applied to the bending area by adjusting the arrangement of the components and the distance between the components.

The protection part of the disclosure may be manufactured in a simple design by a low manufacturing cost and may prevent damage and failure of the display part by an external impact.

The above description is an example of technical features of the disclosure, and those skilled in the art to which the disclosure pertains will be able to make various modifications and variations. Thus, the embodiments of the disclosure described above may be implemented separately or in combination with each other.

Therefore, the embodiments disclosed in the disclosure are not intended to limit the technical spirit of the disclosure, but to describe the technical spirit of the disclosure, and the scope of the technical spirit of the disclosure is not limited by these embodiments. The protection scope of the disclosure should be interpreted by the following claims, and it should be interpreted that all technical spirits within the equivalent scope are included in the scope of the disclosure.

What is claimed is:

1. A display module comprising:
a display part including:
    a display panel including:
        a bending area bent about a bending axis extending in a direction;
        a first area disposed at a side of the bending area and displaying an image; and
        a second area disposed at another side of the bending area and overlapping the first area in a plan view; and
    a circuit board disposed on the display panel in the second area; and
a protection part disposed under the display part, the protection part including:
    a protective film including:
        a top surface facing the second area and the circuit board; and
        an opening overlapping the bending area in a plan view; and
    a cushion layer disposed directly on the top surface of the protective film, the cushion layer comprising a synthetic resin layer comprising a plurality of pores to protect the bending area of the display panel from external impact, wherein the display part further comprises:
    a cover layer disposed on a rear surface of the display panel and including a first side surface adjacent to the bending area; and
    a spacer disposed on a bottom surface of the cover layer and including a second side surface adjacent to the bending area, and
    the second side surface is closer to the bending area than the first side surface.

2. The display module of claim 1, wherein the protective film includes a polyethylene terephthalate film.

3. The display module of claim 1, wherein the cushion layer covers the opening.

4. The display module of claim 1, wherein
an end of the cushion layer is disposed on the display panel in the second area, and
the protective film overlaps the end of the cushion layer and the circuit board in a plan view.

5. The display module of claim 1, wherein a thickness of the protective film is greater than a thickness of the cushion layer.

6. The display module of claim 1, wherein
the circuit board comprises:
    a board; and
    an electronic component disposed on the board, and
the electronic component is exposed from the cushion layer and the protective film.

7. The display module of claim 1, wherein
the display part further comprises:
    a driving chip mounted on the display panel in the second area; and
    a cover film covering the driving chip,
an end of the cover film is aligned with a boundary between the bending area and the second area.

8. The display module of claim 1, wherein
the opening penetrates the protective film,
the cushion layer comprises foam, and
the cushion layer covers an entirety of the opening in a plan view.

9. The display module of claim 1, wherein a modulus of the spacer is less than a modulus of the cover layer.

10. The display module of claim 1, wherein the display part further comprises:
    a first film disposed between the first area of the display panel and the cover layer; and
    a second film disposed between the second area of the display panel and the spacer and spaced apart from the first film.

11. The display module of claim 10, wherein the first film and the second film include a same material.

12. The display module of claim 10, wherein
the first film includes a third side surface adjacent to the bending area, and
the third side surface is closer to the bending area than the first side surface.

13. A display module comprising:
a display part including:
    a display panel having a front surface opposite a rear surface, the display panel including:
        a first area including a display area, wherein an image is displayed on the front surface of the display panel in the first area;
        a bending area extending from a side of the first area; and a second area extending from a side of the bending area;

a cover layer disposed on a rear surface of the display panel;

a spacer disposed on a bottom surface of the cover layer;

a circuit board disposed on the second area; and a cover film disposed on the front surface of the second area of the display panel and directly on the circuit board; and a protection part disposed under the display part, wherein;

an end of the cover film is aligned with a boundary between the bending area and the second area, and the cover film and the circuit board are disposed on a same side of the second area of the display panel.

14. The display module of claim 13, wherein the cover layer includes a first side surface adjacent to the bending area; and the spacer includes a second side surface adjacent to the bending area and protruding from the first side surface of the cover layer toward the bending area.

15. The display module of claim 13, wherein a modulus of the spacer is less than a modulus of the cover layer.

16. The display module of claim 14, wherein the display part further comprises:

a first film overlapping the first area in a plan view and disposed between the display panel and the cover layer; and a second film overlapping the second area in a plan view and spaced apart from the first film, the bending area is disposed between the first film and the second film, and the first film and the second film are disposed on a same side of the display panel.

17. The display module of claim 16, wherein the first film includes a third side surface adjacent to the bending area, and the third side surface protrudes from the first side surface toward the bending area.

18. The display module of claim 13, wherein the display part further comprises:

a window disposed on the display panel;

an anti-reflection layer disposed between the window and the display panel, and the anti-reflection layer is disposed between the window and the first film in a thickness direction of the display panel.

19. The display module of claim 13, wherein the bending area is bent about a bending axis extending in a direction, and the second area and the circuit board are located between the first area and the protection part in a cross-sectional view.

20. The display module of claim 13, wherein the protection part comprises:

a cushion layer; and a protective film disposed on a rear surface of the cushion layer and exposing a portion of the rear surface of the cushion layer the portion of the rear surface of the cushion layer overlapping the bending area in a plan view.

* * * * *